US010332870B2

United States Patent
Do et al.

(10) Patent No.: US 10,332,870 B2
(45) Date of Patent: Jun. 25, 2019

(54) SEMICONDUCTOR DEVICE INCLUDING A FIELD EFFECT TRANSISTOR

(71) Applicant: SAMSUNG ELECTRONICS CO., LTD., Suwon-si, Gyeonggi-Do (KR)

(72) Inventors: Jung-Ho Do, Hwaseong-si (KR); Woojin Rim, Hwaseong-si (KR); Jisu Yu, Seoul (KR); Jonghoon Jung, Seongnam-si (KR)

(73) Assignee: SAMSUNG ELECTRONICS CO, LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/870,143

(22) Filed: Jan. 12, 2018

(65) Prior Publication Data

US 2018/0350791 A1    Dec. 6, 2018

(30) Foreign Application Priority Data

Jun. 1, 2017  (KR) .................. 10-2017-0068600
Aug. 29, 2017 (KR) .................. 10-2017-0109633

(51) Int. Cl.
*H01L 27/02* (2006.01)
*H01L 27/092* (2006.01)
(Continued)

(52) U.S. Cl.
CPC .......... *H01L 27/0207* (2013.01); *G03F 1/36* (2013.01); *G06F 17/5081* (2013.01);
(Continued)

(58) Field of Classification Search
CPC ............... H01L 27/0207; H01L 23/528; H01L 23/5226; H01L 27/092; G03F 1/36; G06F 17/5081; G06F 2217/12
(Continued)

(56) References Cited

U.S. PATENT DOCUMENTS 6,469,949 B1  10/2002 Hsu et al.
7,343,570 B2   3/2008 Bowers et al.
(Continued)

FOREIGN PATENT DOCUMENTS

JP   2007115969   5/2007
JP   2007129030   5/2007
JP   2013239073   5/2007

*Primary Examiner* — Fernando L Toledo
*Assistant Examiner* — Adam S Bowen
(74) *Attorney, Agent, or Firm* — F. Chau & Associates, LLC

(57) ABSTRACT

A semiconductor device includes a substrate having a plurality of active patterns. A plurality of gate electrodes intersects the plurality of active patterns. An active contact is electrically connected to the active patterns. A plurality of vias includes a first regular via and a first dummy via. A plurality of interconnection lines is disposed on the vias. The plurality of interconnection lines includes a first interconnection line disposed on both the first regular via and the first dummy via. The first interconnection line is electrically connected to the active contact through the first regular via. Each of the vias includes a via body portion and a via barrier portion covering a bottom surface and sidewalls of the via body portion. Each of the interconnection lines includes an interconnection line body portion and an interconnection line barrier portion covering a bottom surface and sidewalls of the interconnection line body portion.

20 Claims, 28 Drawing Sheets

(51) Int. Cl.

| | |
|---|---|
| *H01L 23/522* | (2006.01) |
| *G06F 17/50* | (2006.01) |
| *G03F 1/36* | (2012.01) |
| *H01L 23/528* | (2006.01) |
| *H01L 21/8238* | (2006.01) |
| *H01L 23/485* | (2006.01) |
| *H01L 27/118* | (2006.01) |

(52) U.S. Cl.
CPC ........... *H01L 21/823871* (2013.01); *H01L 21/823878* (2013.01); *H01L 23/485* (2013.01); *H01L 23/528* (2013.01); *H01L 23/5223* (2013.01); *H01L 23/5226* (2013.01); *H01L 27/092* (2013.01); *H01L 27/11807* (2013.01); *G06F 2217/12* (2013.01); *H01L 23/5286* (2013.01); *H01L 2027/11875* (2013.01); *H01L 2027/11881* (2013.01)

(58) Field of Classification Search
USPC .......................................................... 257/369
See application file for complete search history.

(56) References Cited

U.S. PATENT DOCUMENTS

| | | | |
|---|---|---|---|
| 8,813,016 | B1 | 8/2014 | Hsu et al. |
| 9,147,652 | B2 | 9/2015 | Okamoto et al. |
| 9,318,442 | B1* | 4/2016 | Chen ..................... H01L 21/486 |
| 2007/0262454 | A1 | 11/2007 | Shibata |
| 2015/0084129 | A1* | 3/2015 | Lee ..................... H01L 29/6681 |
| | | | 257/347 |
| 2015/0091188 | A1* | 4/2015 | Lee ................. H01L 21/823828 |
| | | | 257/774 |
| 2016/0064280 | A1* | 3/2016 | Ookita ............. H01L 21/76898 |
| | | | 257/758 |
| 2017/0003791 | A1* | 1/2017 | Berget .................... G06F 3/044 |
| 2017/0003792 | A1* | 1/2017 | Berget ................. G06F 3/0416 |

* cited by examiner

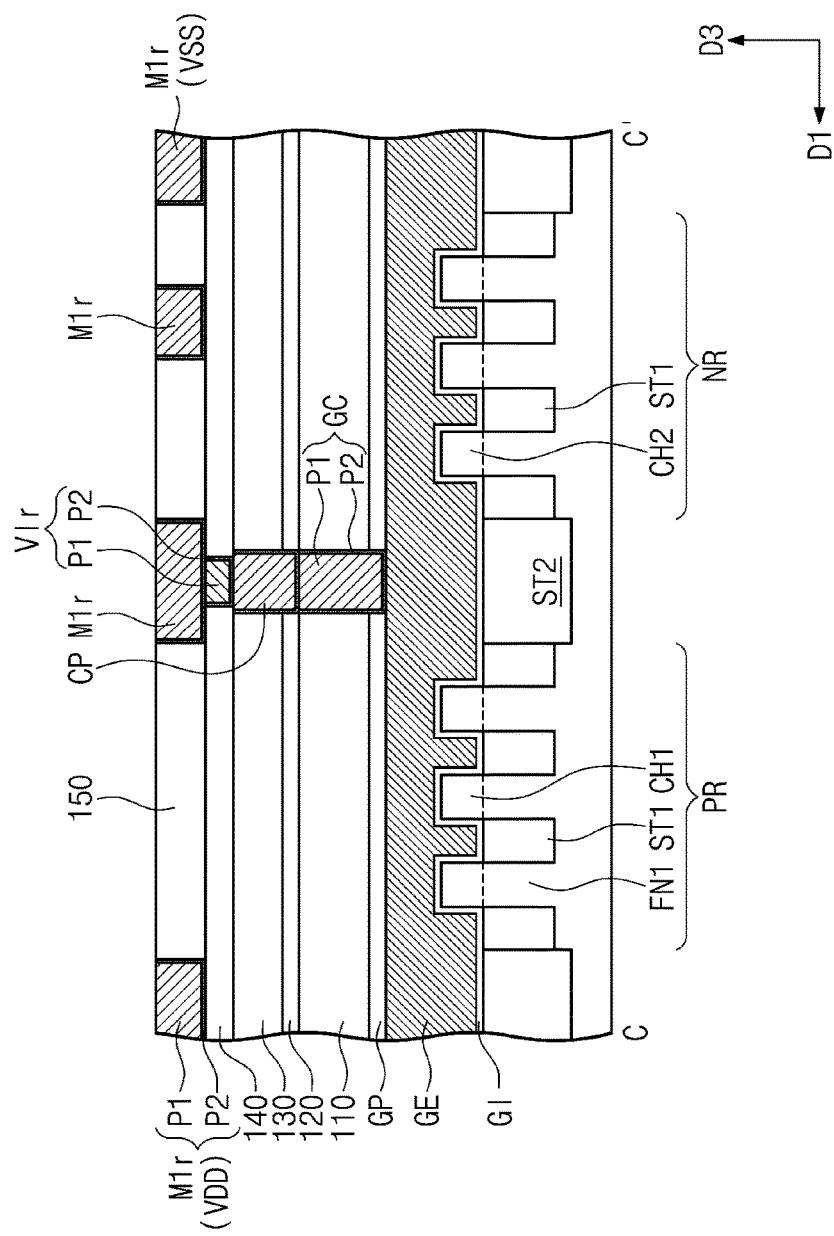

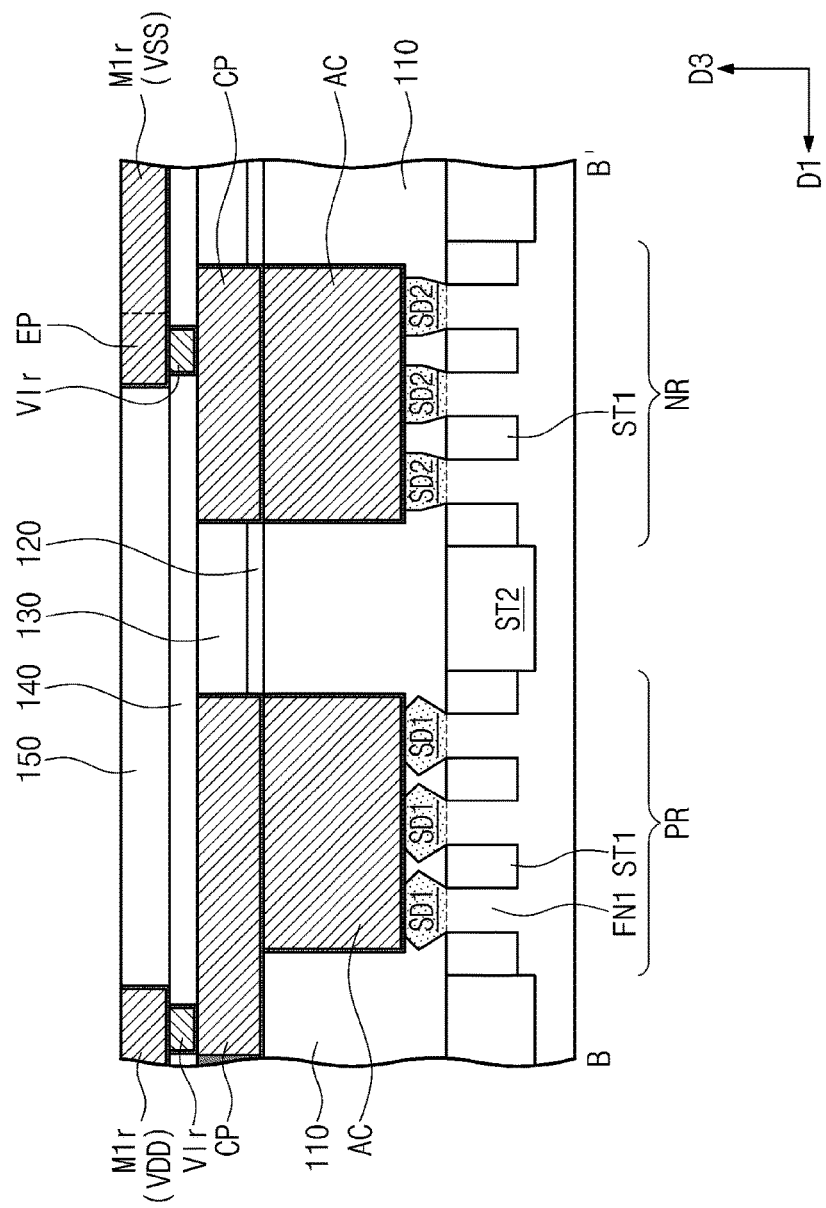

FIG. 17
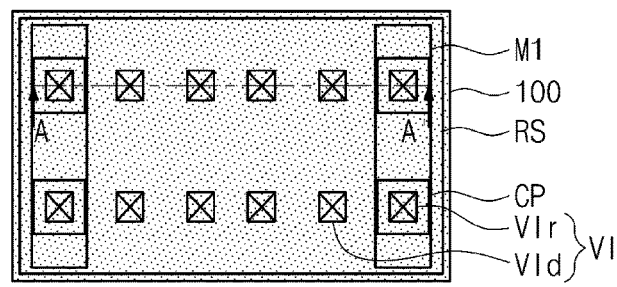
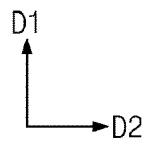
FIG. 18
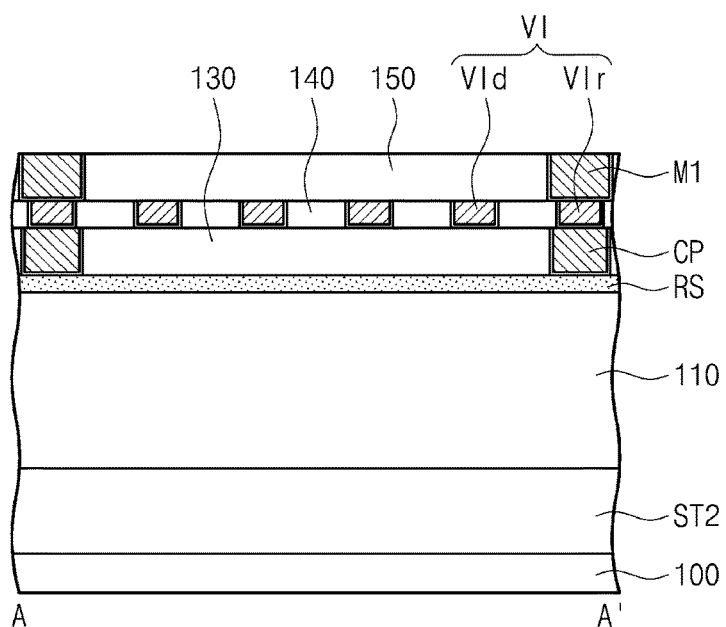
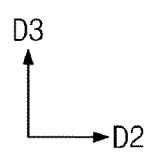

FIG. 25
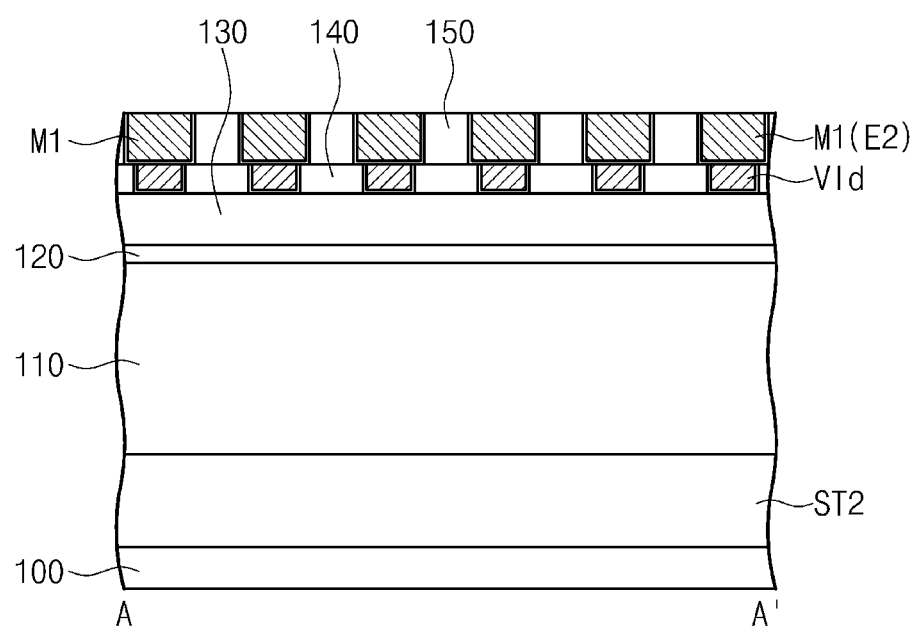
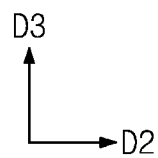

SEMICONDUCTOR DEVICE INCLUDING A FIELD EFFECT TRANSISTOR

CROSS-REFERENCE TO RELATED APPLICATION

This U.S. non-provisional patent application claims priority under 35 U.S.C. § 119 to Korean Patent Application No. 10-2017-0068600, filed on Jun. 1, 2017 and Korean Patent Application No. 10-2017-0109633, filed on Aug. 29, 2017, in the Korean Intellectual Property Office, the disclosures of which are hereby incorporated by reference in their entirety.

TECHNICAL FIELD

The present disclosure relates to a semiconductor device and, more particularly, to a semiconductor device including a field effect transistor.

DISCUSSION OF THE RELATED ART

Semiconductor devices may include semiconductor memory devices that are used for storing logical data, semiconductor logic devices that are used for processing logical data, and hybrid semiconductor devices having both the function of the semiconductor memory devices and the function of the semiconductor logic devices. Semiconductor devices with high-reliable, high-speed, and/or multiple functionality have been increasingly demanded. However, such semiconductor devices may be highly integrated and particularly complex.

SUMMARY

A semiconductor device includes a substrate having a plurality of active patterns. A plurality of gate electrodes intersects the plurality of active patterns. An active contact is electrically connected to the plurality of active patterns. A plurality of vias includes a first regular via and a first dummy via. A plurality of interconnection lines is disposed on the plurality of vias. The plurality of interconnection lines includes a first interconnection line disposed on both the first regular via and the first dummy via. The first interconnection line is electrically connected to the active contact through the first regular via. Each of the plurality of vias includes a via body portion and a via barrier portion covering a bottom surface and sidewalls of the via body portion. Each of the plurality of interconnection lines includes an interconnection line body portion and an interconnection line barrier portion covering a bottom surface and sidewalls of the interconnection line body portion.

A semiconductor device includes a substrate and a plurality of transistors disposed on the substrate. A first interlayer insulating layer covers the plurality of transistors. A second interlayer insulating layer is disposed on the first interlayer insulating layer. A third interlayer insulating layer is disposed on the second interlayer insulating layer. A dummy via is disposed in the second interlayer insulating layer. An interconnection line is disposed on the third interlayer insulating layer. The first interlayer insulating layer covers a bottom surface of the dummy via. The dummy via includes a via body portion and a via barrier portion covering a bottom surface and sidewalls of the via body portion. The interconnection line includes an interconnection line body portion and an interconnection line barrier portion covering a bottom surface and sidewalls of the interconnection line body portion. The interconnection line barrier portion of the interconnection line is disposed between the body portion of the dummy via and the body portion of the interconnection line.

A semiconductor device includes a substrate and a first interlayer insulating layer disposed on the substrate. A second interlayer insulating layer is disposed on the first interlayer insulating layer. A third interlayer insulating layer is disposed on the second interlayer insulating layer. A connection structure is disposed in the first interlayer insulating layer. A plurality of vias is disposed in the second interlayer insulating layer. The plurality of vias includes a regular via and a dummy via. An interconnection line is disposed in the third interlayer insulating layer. The regular via is disposed between the interconnection line and the connection structure and electrically connects the interconnection line to the connection structure. The dummy via is spaced apart from the connection structure. A top surface of the first interlayer insulating layer covers a bottom surface of the dummy via.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIGS. 6A to 6E are cross-sectional views taken along lines A-A', B-B', C-C', D-D', and E-E' of FIG. 5, respectively;

FIGS. 10A and 10B are cross-sectional views taken along lines A-A' and B-B' of FIG. 9, respectively;

FIG. 17 is a plan view illustrating a semiconductor device according to exemplary embodiments of the inventive concepts;

FIG. 18 is a cross-sectional view taken along a line A-A' of FIG. 17;

FIG. 25 is a cross-sectional view taken along a line A-A' of FIG. 24.

DETAILED DESCRIPTION OF THE DRAWINGS

Figure 1:
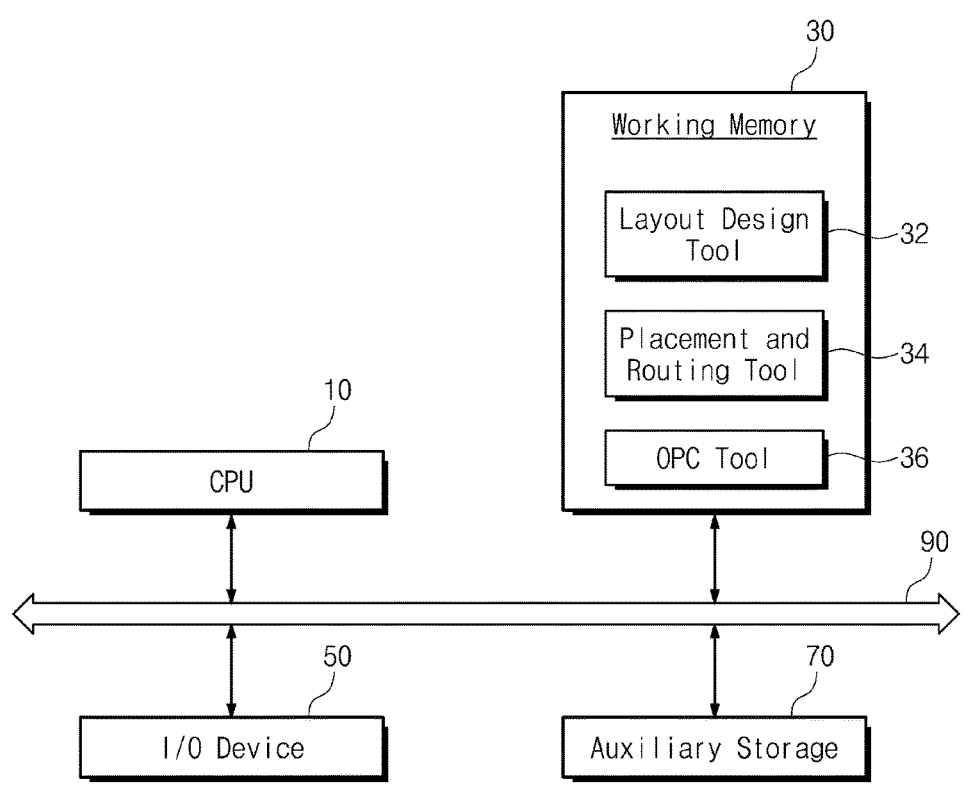
FIG. 1 is a schematic block diagram illustrating a computer system for performing a semiconductor design process, according to exemplary embodiments of the inventive concepts.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 is a schematic block diagram illustrating a computer system for performing a semiconductor design process, according to exemplary embodiments of the inventive concepts. Referring to FIG. 1, a computer system may include a central processing unit (CPU) 10, a working memory 30, an input/output (I/O) device 50, and an auxiliary storage device 70. In some exemplary embodiments of the present invention, the computer system may be a customized system for performing a layout design process. In addition, the computer system may include and execute various design and verification simulation programs.

The CPU 10 may be configured to execute a variety of software (e.g., application programs, an operating system, and device drivers). The CPU 10 may execute the operating system loaded in the working memory 30. In addition, the CPU 10 may execute various application programs driven on the operating system. For example, the CPU 10 may execute a layout design tool 32, a placement and routing tool 34 and/or an OPC tool loaded in the working memory 30.

The operating system or the application programs may be loaded in the working memory 30. For example, when the computer system starts a booting operation, an image of the operating system stored in the auxiliary storage device 70 may be loaded in the working memory 30 according to a booting sequence. Overall input/output operations of the computer system may be managed by the operating system. Likewise, the application programs, which may be selected by a user or may be provided for basic services, may be loaded in the working memory 30.

The layout design tool 32 for the layout design process may be loaded from the auxiliary storage device 70 into the working memory 30. The placement and routing tool 34 may be loaded from the auxiliary storage device 70 into the working memory 30. The placement and routing tool 34 may place designed standard cells, may realign inner interconnection line patterns in the placed standard cells, and may route the placed standard cells. The OPC tool 36 of performing optical proximity correction (OPC) on designed layout data may be loaded from the auxiliary storage device 70 into the working memory 30.

The layout design tool 32 may have a bias function for changing or modifying shapes and positions, defined by a resign rule, of specific layout patterns. In addition, the layout design tool 32 may perform a design rule check (DRC) under a bias data condition modified by the bias function. The working memory 30 may include a volatile memory device (e.g., a static random access memory (SRAM) device or a dynamic random access memory (DRAM) device) and/or a non-volatile memory device (e.g., a PRAM device, a MRAM device, a ReRAM device, a FRAM device, or a NOR flash memory device).

The I/O device 50 may control input and output operations of a user through user interface devices. For example, the I/O device 50 may include a keyboard and/or a monitor and may receive relevant information from a designer. By using the I/O device 50, the designer may receive information on semiconductor regions or data paths which require adjusted operating characteristics. In addition, a process and processed results of the OPC tool 36 may be displayed through the I/O device 50.

The auxiliary storage device 70 may serve as a storage medium of the computer system. The auxiliary storage device 70 may store the application programs, the image of the operating system, and various other data. The auxiliary storage device 70 may be provided in the form of a memory card (e.g., MMC, eMMC, SD, or Micro SD) and/or a hard disk drive (HDD). In some exemplary embodiments of the present invention, the auxiliary storage device 70 may include a NAND-type flash memory device having a large storage capacity. Alternatively, the auxiliary storage device 70 may include a next-generation non-volatile memory devices (e.g., PRAM, MRAM, ReRAM, or FRAM) and/or NOR flash memory devices.

A system interconnector 90 may serve as a system bus for providing a data network within the computer system. The CPU 10, the working memory 30, the I/O device 50, and the auxiliary storage device 70 may each be electrically connected to each other through the system interconnector 90, and data may be exchanged therebetween through the system interconnector 90. However, the system interconnector 90 is not limited to the aforementioned configuration. In certain exemplary embodiments of the preset invention, the system interconnector 90 may further include an additional element for increasing efficiency in data communication.

Figure 2:
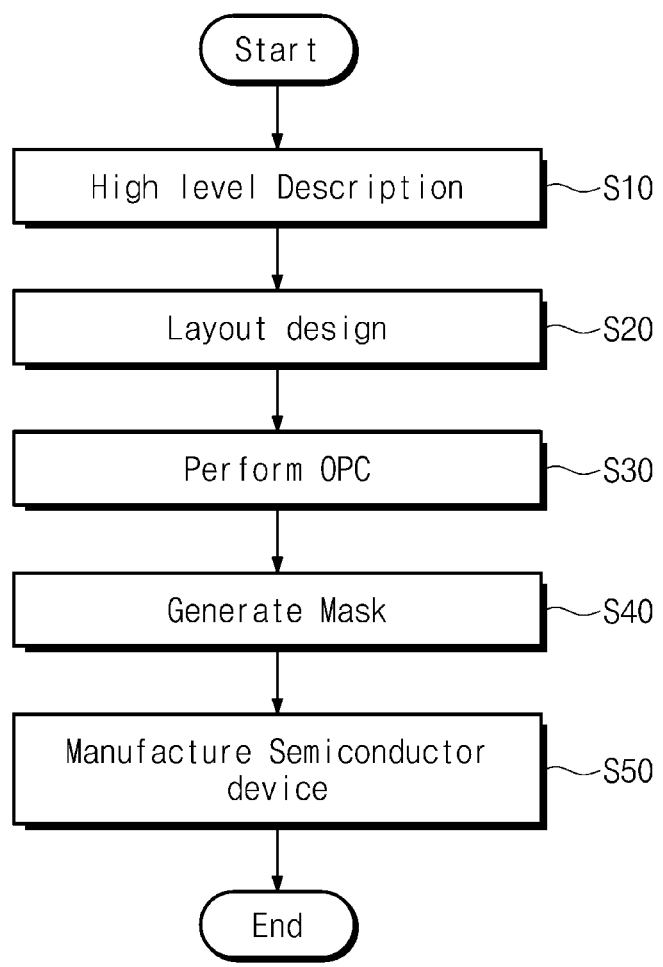
FIG. 2 is a flowchart illustrating a method for designing and manufacturing a semiconductor device, according to exemplary embodiments of the inventive concepts.

FIG. 2 is a flowchart illustrating a method for designing and manufacturing a semiconductor device, according to exemplary embodiments of the inventive concepts.

Referring to FIG. 2, a high-level design process of a semiconductor integrated circuit may be performed using the computer system described with reference to FIG. 1 (S10). The high-level design process may include designing an integrated circuit with a high-level computer language. For example, the high-level computer language may be a C language. Circuits designed by the high-level design process may be more concretely described by a register transfer level (RTL) coding or simulation. In addition, codes generated by the RTL coding may be converted into netlists, and the netlists may be combined with each other to realize an entire semiconductor device. The combined schematic circuit may be verified by a simulation tool. In some exemplary embodiments of the present invention, an adjusting operation may further be performed based on results of the verification.

A layout design process may be performed to realize a logically completed semiconductor integrated circuit on a silicon substrate (S20). For example, the layout design process may be performed based on the schematic circuit prepared in the high-level design process or the netlist corresponding thereto. The layout design process may include a routing operation of placing and connecting various standard cells that are provided from a cell library based on a predetermined design rule.

The cell library for the layout design process may also include information on operations, speeds and power consumption of the standard cells. In some exemplary embodiments of the present invention, a cell library for representing a layout of a circuit having a specific gate level may be defined in most layout design tools. Here, the layout may, define or describe shapes and sizes of patterns for constituting transistors and metal interconnection lines which will be physically formed on a silicon substrate. For example, layout patterns (e.g., PMOS, NMOS, N-WELL, gate electrodes, and metal interconnection lines to be disposed thereon) may be placed to physically form an inverter circuit on a silicon substrate. For this, inverters defined in the cell library may be searched and selected.

The routing operation may be performed on the selected and placed standard cells. For example, upper interconnection lines (e.g., routing patterns) may be placed on the placed standard cells. The placed standard cells may be connected to each other by the routing operation to fit the design. The placement and routing of the standard cells may be automatically performed by the placement and routing tool 34.

After the routing operation, a verification operation may be performed on the layout to verify whether there is a portion violating the design rule. In some exemplary embodiments of the present invention, the verification operation may include evaluating verification items, such as a design rule check (DRC) item, an electrical rule check (ERC) item, and a layout vs schematic (LVS) item. The DRC item may be performed to check whether the layout meets the design rule. The ERC item may be performed to check whether there is an issue of electrical disconnection in the layout. The LVS item may be performed to check whether the layout is prepared to coincide with the gate-level netlist.

An optical proximity correction (OPC) process may be performed (S30). The layout patterns obtained by the layout design process may be realized on a silicon substrate by a photolithography process. The OPC process may be performed to correct an optical proximity effect which may occur in the photolithography process. The optical proximity effect may be an unintended optical effect (such as refraction or diffraction) which may occur in the photolithography process. For example, a distortion phenomenon of layout patterns, which may be caused by the optical proximity effect, may be corrected by the OPC process. The shapes and positions of the designed layout patterns may be modified or biased by the OPC process.

A photomask may be generated based on the layout modified by the OPC process (S40). In general, the photomask may be generated by patterning a chromium layer deposited on a glass substrate by using the layout pattern data.

A semiconductor device may be manufactured using the generated photomask (S50). Various exposure and etching processes may be repeated in the manufacture of the semiconductor device using the photomask. By these processes, shapes of patterns obtained in the layout design process may be sequentially formed on a silicon substrate.

Figure 3:
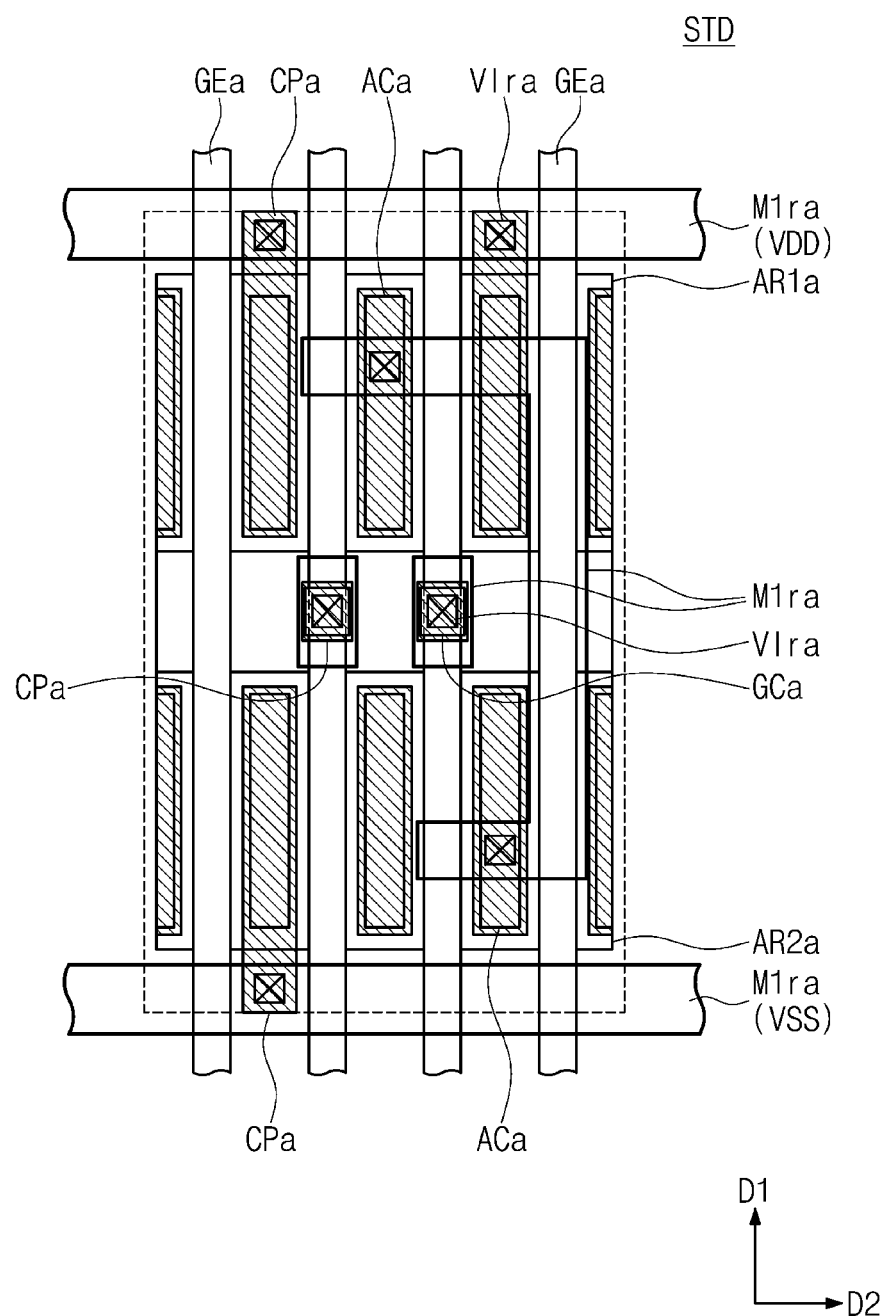
FIG. 3 is a diagram illustrating a layout of a standard cell provided from a cell library.

FIG. 3 is a figure illustrating a layout of a standard cell provided from a cell library.

Referring to FIGS. 2 and 3, the cell library of the layout design process (S20) may include standard cells. For example, in FIG. 3, a standard cell STD provided from the cell library may be a NAND cell. The standard cell STD may include a first active region AR1*a*, a second active region AR2*a*, gate patterns GEa, active contact patterns ACa, gate contact patterns GCa, connection patterns CPa, via patterns VIra, and interconnection line patterns M1*ra*.

The first active region AR1*a* and the second active region AR2*a* may extend in a second direction D2. The first active region AR1*a* and the second active region AR2*a* may be spaced apart from each other in a first direction D1. The first direction D1 may intersect (e.g., be perpendicular to) the second direction D2. The first active region AR1*a* and the second active region AR2*a* may define a PMOSFET region and an NMOSFET region, respectively.

The gate patterns GEa may extend in the first direction D1 and may be arranged in the second direction D2. The gate patterns GEa may intersect the first active region AR1*a* and the second active region AR2*a*. The gate patterns GEa may define gate electrodes.

The active contact patterns ACa may be disposed on the first and second active 110 regions AR1*a* and AR2*a*. The active contact patterns ACa may be disposed between the gate patterns GEa. The gate contact patterns GCa may be disposed between the first and second active regions AR1*a* and AR2*a*. The gate contact patterns GCa may be disposed on the gate patterns GEa. The active contact patterns ACa may define active contacts, and the gate contact patterns GCa may define gate contacts.

The connection patterns CPa may overlap the active contact patterns ACa and the gate patterns GEa. At least one of the connection patterns CPa may further extend from one end of the active contact pattern ACa in the first direction D1. At least one of the connection patterns CPa may at least partially overlap with the interconnection line pattern M1*ra* defining a power interconnection line to which a power voltage is applied. At least one of the connection patterns CPa may at least partially overlap with the interconnection line pattern M1*ra* defining a ground interconnection line to which a ground voltage is applied. The connection patterns CPa may define connection structures.

The via patterns VIra may be placed or disposed on the connection patterns CPa. The interconnection line patterns M1*ra* may be placed or disposed on the via patterns VIra. The interconnection line patterns M1*ra* extending in the second direction D2 on both boundaries of the standard cell. STD may define the power interconnection line and the ground interconnection line. The via patterns VIra may define vias, and the interconnection line patterns M1*ra* may define interconnection lines.

Figure 4:
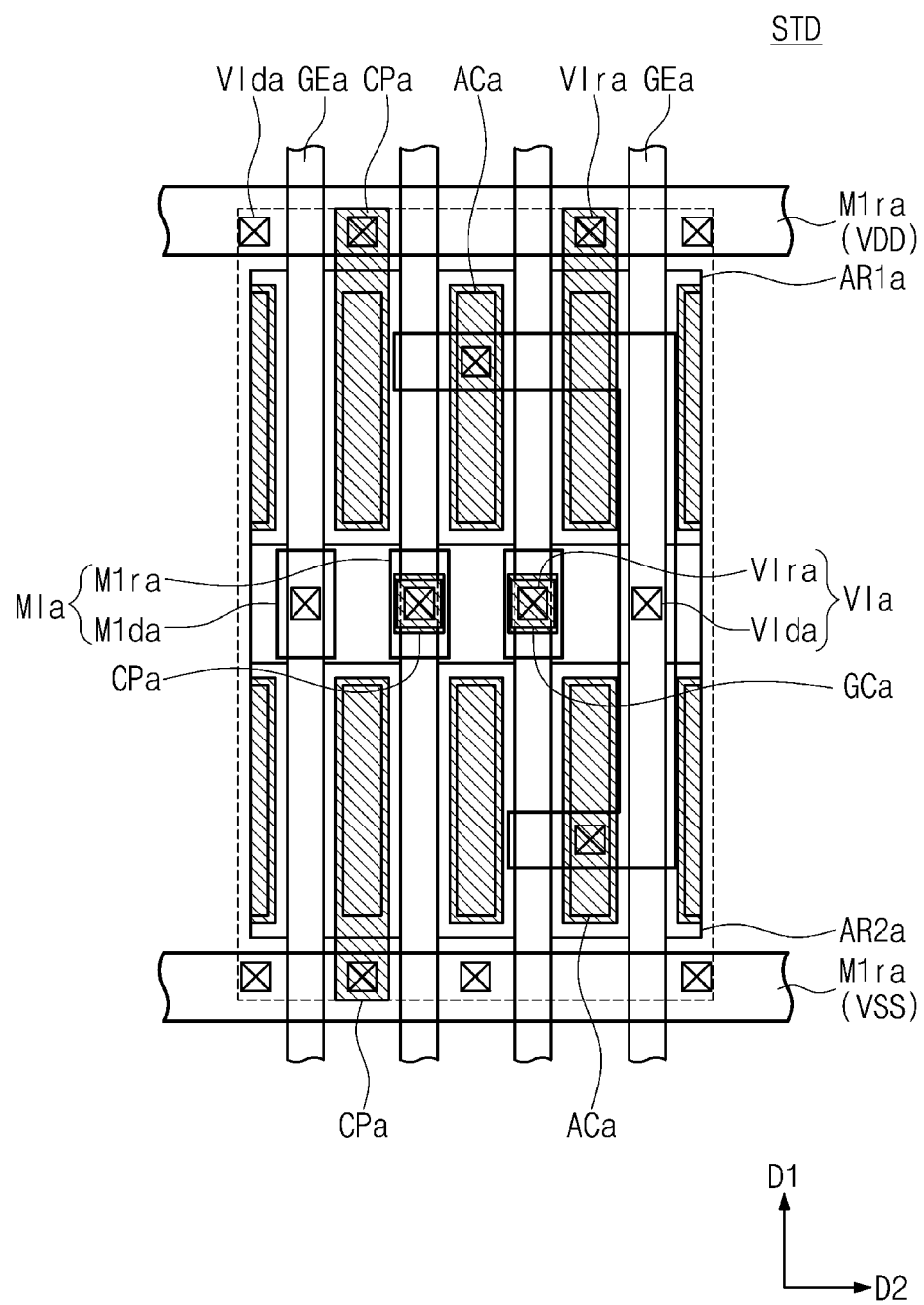
FIG. 4 is a diagram illustrating a layout of a standard cell according to exemplary embodiments of the inventive concepts, which is provided from a cell library.

FIG. 4 is a diagram illustrating a layout of a standard cell according to exemplary embodiments of the inventive concepts, which is provided from a cell library. To the extent that descriptions of various features of various elements are omitted, these features may be understood to be at least similar to corresponding features of corresponding elements described elsewhere in this specification. Accordingly, differences between the present embodiment and the standard cell of FIG. 3 will be mainly described hereinafter.

Referring to FIGS. 2 and 4, the layout design process (S20) may include placing additional layout patterns on the standard cell STD of FIG. 3. In more detail, dummy via patterns VIda and a dummy interconnection line pattern M1da may further be placed on the standard cell STD of FIG. 3.

The standard cell STD, according to exemplary embodiments of the present invention, may include via patterns VIa and interconnection line patterns M1a. The via patterns VIa may include regular via patterns Iira and the dummy via patterns VIda. The interconnection line patterns M1a may include regular interconnection line patterns M1ra and the dummy interconnection line pattern M1da.

The dummy via patterns VIda may be provided in an area in which the connection patterns CPa are absent from. The dummy via patterns VIda may be provided in an area in which the active contact patterns ACa and the gate contact patterns GCa are absent from. The dummy via patterns VIda may overlap with the interconnection line patterns M1a.

In some exemplary embodiments of the present invention, the dummy via patterns VIda may overlap with the regular interconnection line patterns M1ra defining the power interconnection line and the ground interconnection line. In some exemplary embodiments of the present invention, at least one of the dummy via patterns VIda may overlap with the dummy interconnection line pattern M1da provided between the first and second active regions AR1a and AR2a. According to exemplary embodiments of the present invention, at least one of the dummy via patterns VIda may overlap with at least one of the regular interconnection line patterns M1ra.

The dummy via patterns VIda added in this manner may increase the number of the via patterns VIa in the standard cell STD. For example, the standard cell STD may have a relatively high pattern density of the via patterns VIa. In the present specification, the term 'pattern density' may refer to the number of patterns per unit area. Since the pattern density of the via patterns VIa is increased, it is possible to reduce or minimize a distortion phenomenon of light which may occur in an exposure process for realizing the via patterns VIa.

Figure 5:
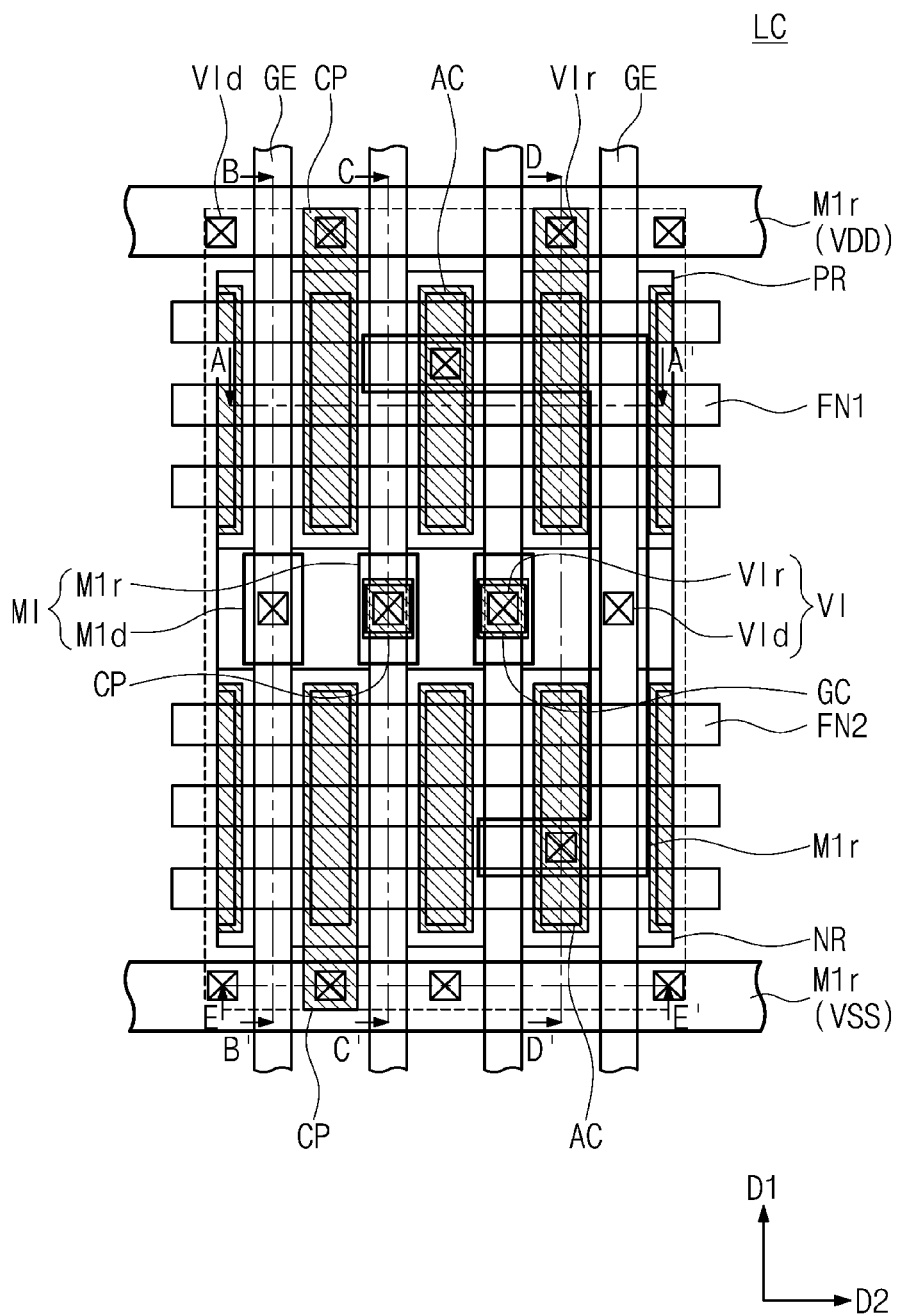
FIG. 5 is a plan view illustrating a semiconductor device according to exemplary embodiments of the inventive concepts.

FIG. 5 is a plan view illustrating a semiconductor device according to exemplary embodiments of the inventive concepts. FIGS. 6A to 6E are cross-sectional views taken along lines A-A', B-B', C-C', D-D', and E-E' of FIG. 5, respectively. A semiconductor device illustrated in FIGS. 5 and 6A to 6E is an example of a semiconductor device that is realized on a physical substrate by using the layout of the standard cell of FIG. 4.

Referring to FIGS. 5 and 6A to 6E, a logic cell LC may be provided on a substrate 100. Logic transistors for constituting a logic circuit may be disposed in the logic cell LC. For example, the logic cell LC, of FIG. 5 may be a NAND cell. Hereinafter, the logic transistors and interconnection lines of the logic cell LC will be described in more detail.

The substrate 100 may be a silicon substrate, a germanium substrates or a silicon-on-insulator (SOI) substrate. Second device isolation layers ST2 may be provided in the substrate 100 to define a PMOSFET region PR and an NMOSFET region NR. The second device isolation layers ST2 may be formed in an upper portion of the substrate 100.

The PMOSFET region PR and the NMOSFET region NR may be spaced apart from each other in a first direction D1 with the second device isolation layer ST2 interposed therebetween. The PMOSFET region PR and the NMOSFET region NR may extend in a second direction D2 to intersect the logic cell LC. The second device isolation layers ST2 may define additional PMOSFET regions and additional NMOSFET regions as well as the PMOSFET region PR and the NMOSFET region NR.

A plurality of first active patterns FN1 extending in the second direction D2 may be provided on the PMOSFET region PR. A plurality of second active patterns FN2 extending in the second direction D2 may be provided on the NMOSFET region NR. The first and second active patterns FN1 and FN2 may be portions of the substrate 100, which protrude from a top surface of the substrate 100. The first and second active patterns FN1 and FN2 may be arranged along the first direction D1.

For example, three first active patterns FN1 may extend in the second direction D2 in parallel with each other on the PMOSFET region PR. For example, three second active patterns FN2 may extend in the second direction D2 in parallel with each other on the NMOSFET region NR. However, the number and shapes of the first active patterns FN1 on the PMOSFET region PR and the number and shapes of the second active patterns FN2 on the NMOSFET region NR may be varied from what is illustrated in FIGS. 5 and 6A to 6E and the present invention may utilize any number and shapes for the first and second active patterns.

First device isolation layers ST1 extending in the second direction D2 may be disposed at both sides of each of the first and second active patterns FN1 and FN2. Some of the first device isolation layers ST1 may fill trenches between the first active patterns FN1. Others of the first device isolation layers ST1 may fill trenches between the second active patterns FN2.

Upper portions of the first and second active patterns FN1 and FN2 may be higher than top surfaces of the first device isolation layers ST1. The upper portions of the first and second active patterns FN1 and FN2 may protrude vertically from the first device isolation layers ST1. The upper portion of each of the first and second active patterns FN1 and FN2 may have a fin-shape protruding from between a pair of the first device isolation layers ST1.

The second device isolation layers ST2 and the first device isolation layers ST1 may be connected to each other to constitute one insulating layer. Top surfaces of the second device isolation layers ST2 may be coplanar with the top surfaces of the first device isolation layers ST1. Thicknesses (or depths) of the second device isolation layers ST2 may be greater than thicknesses (or depths) of the first device isolation layers ST1. In this case, the first device isolation layers ST1 may be formed by a process different from a process of forming the second device isolation layers ST2. For example, the first and second device isolation layers ST1 and ST2 may each include a silicon oxide layer.

First channel regions CH1 and first source/drain regions SD1 may be provided in the upper portions of the first active patterns FN1. The first source/drain regions SD1 may be P-type dopant regions. Each of the first channel regions CH1 may be disposed between a pair of the first source/drain regions SD1 adjacent to each other. Second channel regions CH2 and second source/drain regions SD2 may be provided in the upper portions of the second active patterns FN2. The second source/drain regions SD2 may be N-type dopant regions. Each of the second channel regions CH2 may be disposed between a pair of the second source/drain regions SD2 adjacent to each other.

The first and second source/drain regions SD1 and SD2 may each include epitaxial patterns formed by a selective epitaxial growth (SEG) process. Top surfaces of the first and second source/drain regions SD1 and SD2 may each be disposed at a higher level than top surfaces of the first and second channel regions CH1 and CH2. Each of the first and second source/drain regions SD1 and SD2 may include a semiconductor element different from that of the substrate 100. According to exemplary embodiments of the present invention, the first source/drain regions SD1 may include a semiconductor element of which a lattice constant is greater than that of the semiconductor element of the substrate 100. Thus, the first source/drain regions SD1 may provide compressive stress to the first channel regions CH1. According to exemplary embodiments of the present invention, the second source/drain regions SD2 may include a semiconductor element of which a lattice constant is smaller than that of the semiconductor element of the substrate 100. Thus, the second source/drain regions SD2 may provide tensile stress to the second channel regions CH2. In some exemplary embodiments of the present invention, the second source/drain regions SD2 may include the same semiconductor element as the substrate 100.

Figure 6A:
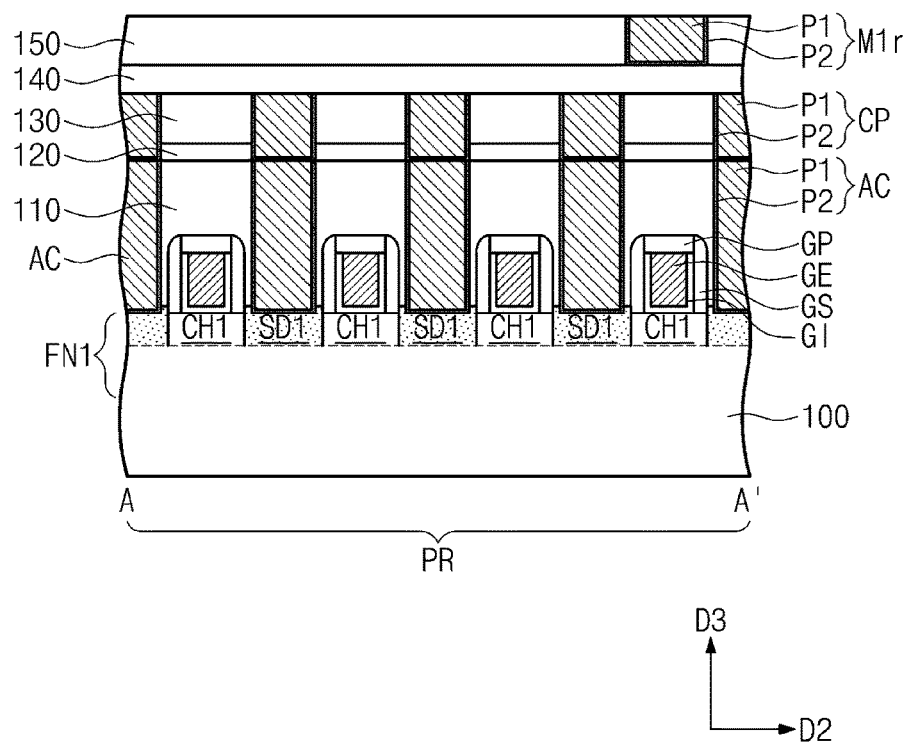
Figure 6B:
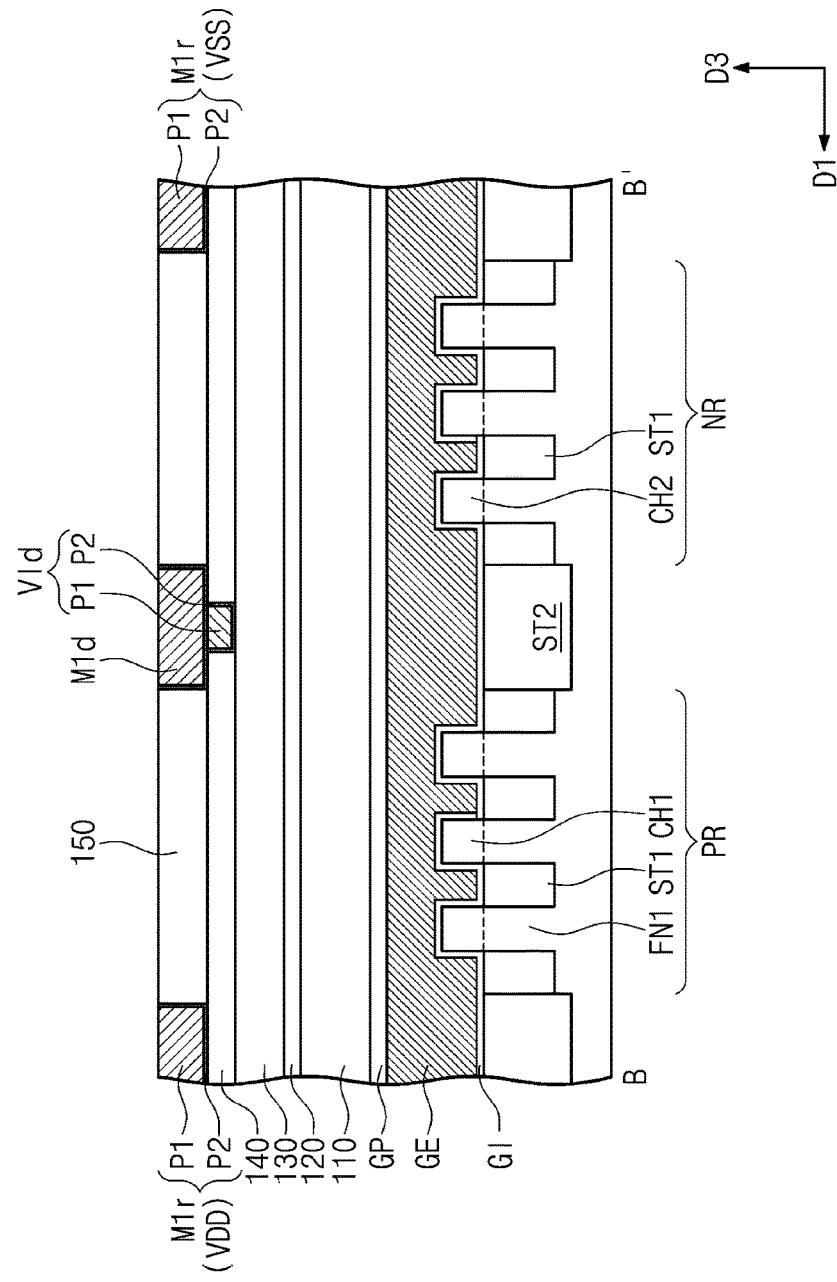
Figure 6D:
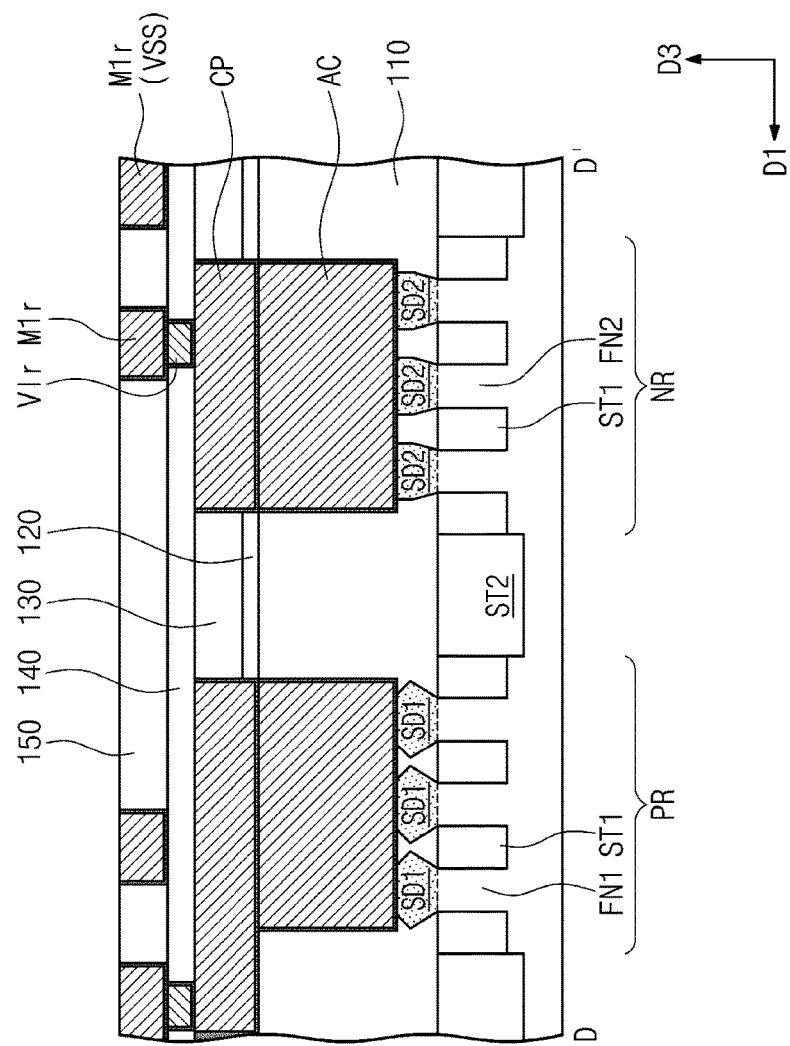
Figure 6E:
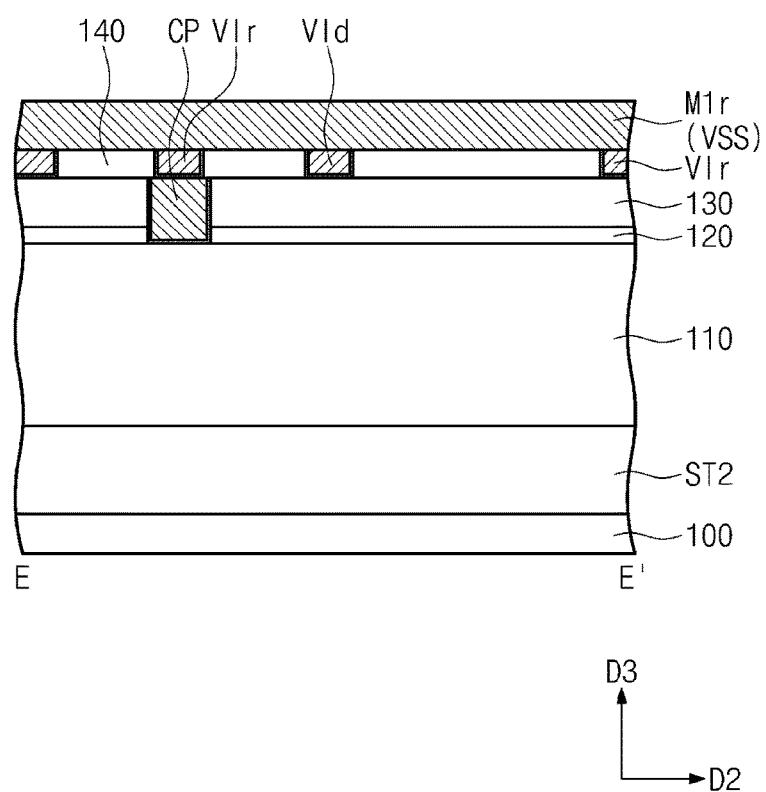

Cross-sectional shapes of the first source/drain regions SD1 may be different from cross-sectional shapes of the second source/drain regions SD2 when viewed in a cross-sectional view taken along the first direction D1 (see FIG. 6D). For example, the first source/drain regions SD1 may include silicon-germanium (Site), and the second source/drain regions SD2 may include silicon.

Gate electrodes GE extending in the first direction D1 may intersect each of the first and second active patterns FN1 and FN2. The gate electrodes GE may be spaced apart from each other in the second direction D2. The gate electrodes GE may vertically overlap with each of the first and second channel regions CH1 and CH2. Each of the gate electrodes GE may surround a top surface and both sidewalls of each of the first and second channel regions CH1 and CH2 (see FIGS. 6B and 6C). For example, the gate electrodes GE may include a conductive metal nitride (e.g., titanium nitride or tantalum nitride) and/or a metal material (e.g., titanium, tantalum, tungsten, copper, or aluminum).

A pair of gate spacers GS may be disposed on both (opposite) sidewalls of each of the gate electrodes GE, respectively. The gate spacers GS may extend along the gate electrodes GE in the first direction D1. Top surfaces of the gate spacers GS may be higher than top surfaces of the gate electrodes GE. The top surfaces of the gate spacers GS may be coplanar with a top surface of a gate capping layer GP, as is described in detail below. For example, the gate spacers GS may include SiCN, SiCON, and/or SiN. In some exemplary embodiments of the present invention, each of the gate spacers GS may have a multi-layered structure formed of at least two of SiCN, SiCON, or SiN.

Gate dielectric layers GI may be disposed between the gate electrodes GE and the active patterns FN1 and FN2. Each of the gate dielectric layers GI may extend along a bottom surface of each of the gate electrodes GE. Each of the gate dielectric layers GI may cover the top surface and the both sidewalls of each of the first and second channel regions CH1 and CH2. The gate dielectric layers GI may include a high-k dielectric material of which a dielectric constant is higher than that of silicon oxide. For example, the high-k dielectric material may include hafnium oxide, hafnium-silicon oxide, lanthanum oxide, zirconium oxide, zirconium-silicon oxide, tantalum oxide, titanium oxide, barium-strontium-titanium oxide, barium-titanium oxide, strontium-titanium oxide, lithium oxide, aluminum oxide, lead-scandium-tantalum oxide, and/or lead-zinc niobate.

A gate capping layer UP may be provided on each of the gate electrodes GE. The gate capping layers GP may extend along the gate electrodes GE in the first direction D1. The gate capping layers GP may include a material having an etch selectivity with respect to a first interlayer insulating layer 110, as is described in additional detail below. For example, the gate capping layers GP may include SiON, SiCN, SiCON, and/or SiN.

A first interlayer insulating layer 110 may cover each of the first and second active patterns FN1 and FN2, the gate spacers GS, and the gate capping layers GP. Second to fifth interlayer insulating layers 120, 130, 140 and 150 may be sequentially stacked on the first interlayer insulating layer 110. Each of the first to fifth interlayer insulating layers 110 to 150 may include a silicon oxide layer or a silicon oxynitride layer.

At least one active contact AC may penetrate the first interlayer insulating layer 110 between a pair of the gate electrodes GE so as to be electrically connected to the first and/or second source/drain regions SD1 and/or SD2. The active contacts AC may have bar shapes extending in the first direction D1 According to exemplary embodiments of the present invention, at least one active contact AC may be connected to a plurality of the first source/drain regions SD1. According to exemplary embodiments of the present invention, at least one active contact AC may be connected to a plurality of the second source/drain regions SD2. In some exemplary embodiments of the present invention, at least one active contact AC may be connected to one first source/drain region SD1 or one second source/drain region SD2. However, the present inventive concepts may have various alternative configurations.

At least one gate contact GC may penetrate the first interlayer insulating layer 110 and the gate capping layer GP so as to be electrically connected to at least one gate electrode GE. The gate contacts GC may be disposed between the PMOSFET region PR and the NMOSFET region NR when viewed in a plan view. The gate contacts GC may vertically overlap with the second device isolation layer ST2 between the PMOSFET region PR and the NMOSFET region NR.

The active contact AC and the gate contact GC may each include a body portion P1 and a barrier portion P2. The barrier portion P2 may cover a bottom surface and sidewalls of the body portion P1. The barrier portion P2 might not cover a top surface of the body, portion P1.

The body portions P1 of the active contacts AC may include the same conductive material as the body portions P1 of the gate contacts GC. For example, the body portions P1 of the active contacts AC and the gate contacts GC may include aluminum, copper, tungsten, molybdenum, and/or cobalt. The barrier portion P2 of each of the active contacts AC and the gate contacts GC may include a metal layer/a metal nitride layer. The metal layer may include titanium, tantalum, tungsten, nickel, cobalt, and/or platinum. The metal nitride layer may include a titanium nitride (TiN) layer, a tantalum nitride (TaN) layer, a tungsten nitride (WN) layer, a nickel nitride (NiN) layer, a cobalt nitride (CoN) layer, and/or a platinum nitride (PtN) layer.

Connection structures CP may be provided on the active contacts AC, and the gate contacts GC. The connection structures CP may penetrate the second and third interlayer insulating layers 120 and 130 so as to be electrically connected to the active contacts AC and the gate contacts GC. The connection structures CP may overlap with the active contacts AC and the gate contacts GC when viewed in a plan view. At least one connection structure CP on the active contact AC may further extend from one end of the active contact AC in the first direction D1. Thus, the extending portion of the at least one connection structure CP may be disposed under a power interconnection line VDD or a ground interconnection line VSS of regular interconnection lines M1r.

Each of the connection structures CP may include a body portion P1 and a barrier portion P2. Descriptions to the body portion P1 and the barrier portion P2 of the connection structure CP may be substantially the same as the descriptions to the body portion P1 and the barrier portion P2 of each of the active and gate contacts AC and GC described above. The body portion P1 of each of the connection structures CP may include the same conductive material as the body portion P1 of each of the active contacts AC and the gate contacts GC. The barrier portion P2 of each of the connection structures CP may include the same barrier material as the barrier portion P2 of each of the active contacts AC and the gate contacts GC.

Vias VI may be provided in the fourth interlayer insulating layer 140. The vias VI may include regular vias VIr which are electrically connected to the connection structures CP, and dummy vias VId which are not electrically connected to the connection structures CP. For example, the regular vias VIr may be electrically connected to the active contacts AC and/or the gate contacts GC. The dummy vias VId might not be electrically connected to the active contacts AC and the gate contacts GC. The dummy vias VId may be spaced apart from the connection structures CP, the active contacts AC, and the gate contacts GC. The third interlayer insulating layer 130 may completely cover bottom surfaces of the dummy vias VId.

At least one of the dummy vias VId may overlap with the gate electrode GE when viewed in a plan view. The at least one dummy via VId may be spaced apart from the gate electrode GE with the first to third interlayer insulating layers 110, 120 and 130 interposed therebetween. Thus, the at least one dummy via VId might not be electrically connected to the gate electrode GE.

Each of the vias VI may include a body portion P1 and a barrier portion P2. Descriptions to the body portion P1 and the barrier portion P2 of each of the vias VI may be substantially the same as the descriptions to the body portion P1 and the barrier portion P2 of each of the active and gate contacts AC and GC described above. The body portion P1 of each of the vias VI may include a conductive material different from that of the body portion P1 of each of the active contacts AC and the gate contacts GC. The barrier portion P2 of each of the vias VI may include a barrier material which is the same as or different from that of the barrier portion P2 of each of the active contacts AC and the gate contacts GC.

Interconnection hues M1 may be provided in the fifth interlayer insulating layer 150. The interconnection lines M1 may constitute a first metal layer. The interconnection lines M1 may include regular interconnection lines M1r and at least one dummy interconnection line M1d. The regular interconnection lines M1r may be electrically connected to the active contacts AC and/or the gate contacts GC through the regular vias VIr and the connection structures CP. The dummy interconnection line M1d may be connected to only the dummy via VId and thus might not be electrically connected to the active contacts AC and the gate contacts GC.

Each of the interconnection lines M1 may include a body portion P1 and a barrier portion P2. Descriptions to the body portion P1 and the barrier portion P2 of each of the interconnection lines M1 may be substantially the same as the descriptions to the body portion P1 and the barrier portion P2 of each of the active and gate contacts AC and GC described above. The body portion P1 of each of the interconnection lines M1 may include the same conductive material as the body portion P1 of each of the vias VI. The barrier portion P2 of each of the interconnection lines M1 may include the same barrier material as the barrier portion P2 of each of the vias VI. For example, the body portions P1 of the interconnection lines M1 and the vias VI may include copper. The body portions P1 of the active contacts AC, the gate contacts GC and the connection structures CP may include cobalt.

Some of the vias VI may be disposed between the connection structures CP and corresponding ones of the interconnection lines M1 to electrically connect the corresponding interconnection lines M1 to the connection structures CP. The vias VI may be formed by a single damascene process, and the interconnection lines M1 may be formed by a single damascene process after the formation of the vias VI. Thus, the barrier portion P2 of the interconnection line M1 may be disposed between the body portion P1 of the interconnection line M1 and the body portion P1 of the via VI.

The interconnection lines M1 may include a power interconnection line VDD and a ground interconnection line VSS which extend in the second direction D2 on both boundaries of the logic cell LC. The dummy vias VId as well as the regular vias VIr may be connected to each of the power interconnection line VDD and the ground interconnection line VSS. The regular vias VIr and the dummy vias VId connected to each of the power and ground interconnection lines VDD and VSS may be arranged in the second direction D2.

Figure 7:
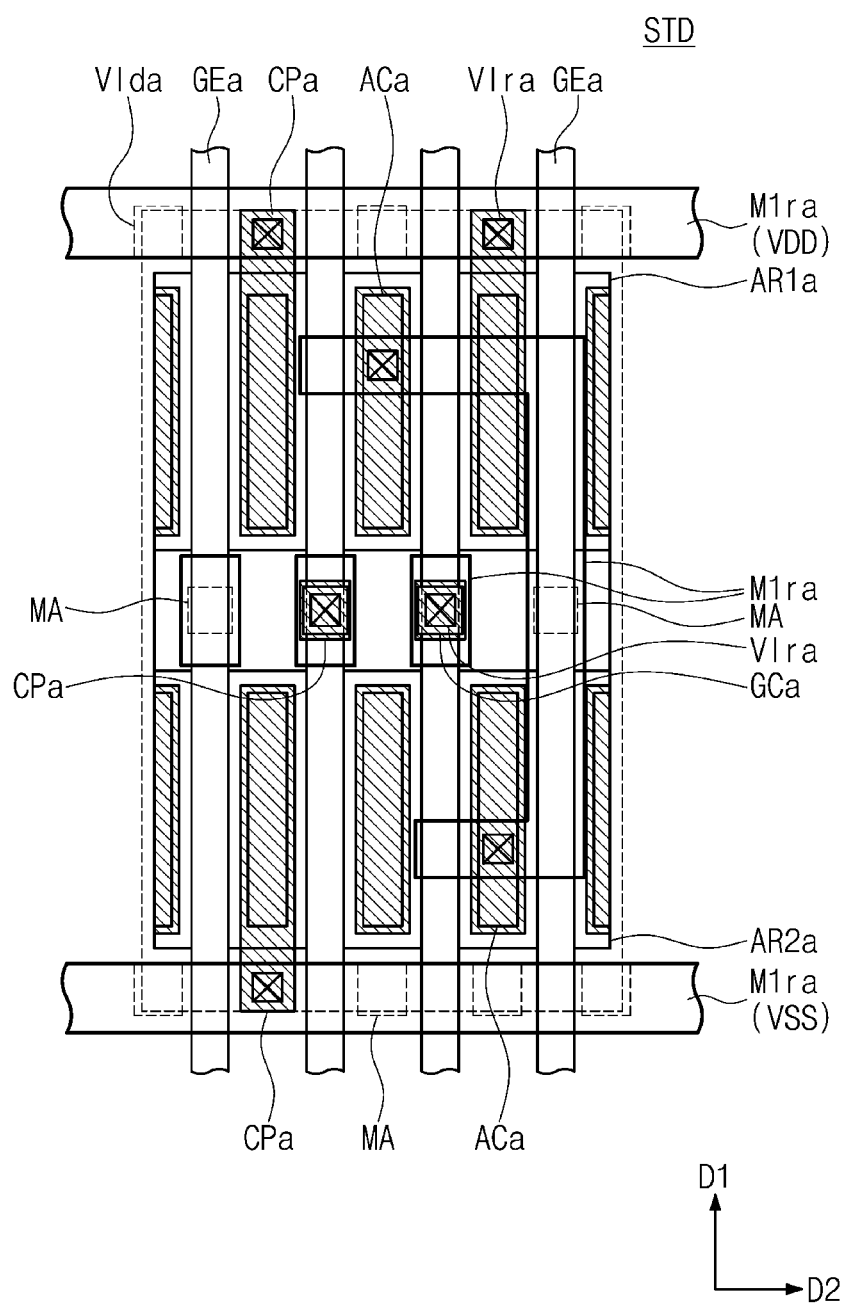
FIG. 7 is a diagram illustrating a layout of a standard cell according to exemplary embodiments of the inventive concepts, which is provided from a cell library.

FIG. 7 is a layout of a standard cell according to exemplary embodiments of the present inventive concepts, which is provided from a cell library. Here, the descriptions to the same technical features as described above with respect to FIGS. 3 and 4 may be omitted and it may be assumed that the omitted descriptions are at least similar to the descriptions of corresponding elements discussed elsewhere within the present disclosure. For example, differences between the arrangement of FIG. 7 and the arrangements of FIGS. 3 and 4 will be mainly described hereinafter.

Referring to FIGS. 2 and 7, the layout design process (S20) may include marking the standard cell STD of FIG. 3 with positions at which dummy via patterns can be placed. For example, marks MA may be placed on the layout of the standard cell STD. The marks MA may represent areas in which the dummy via patterns can be placed. The marks MA may be provided in an area in which the connection patterns CPa are absent from. The marks MA may be provided in an area in which the active contact patterns ACa and the gate contact patterns GCa are absent from.

Referring again to FIG. 4, the standard cell STD of FIG. 7 may be placed in a cell block in the routing operation of placing and routing the standard cells. The dummy via patterns VIda may be placed on the marks MA of the standard cell STD.

Figure 8:
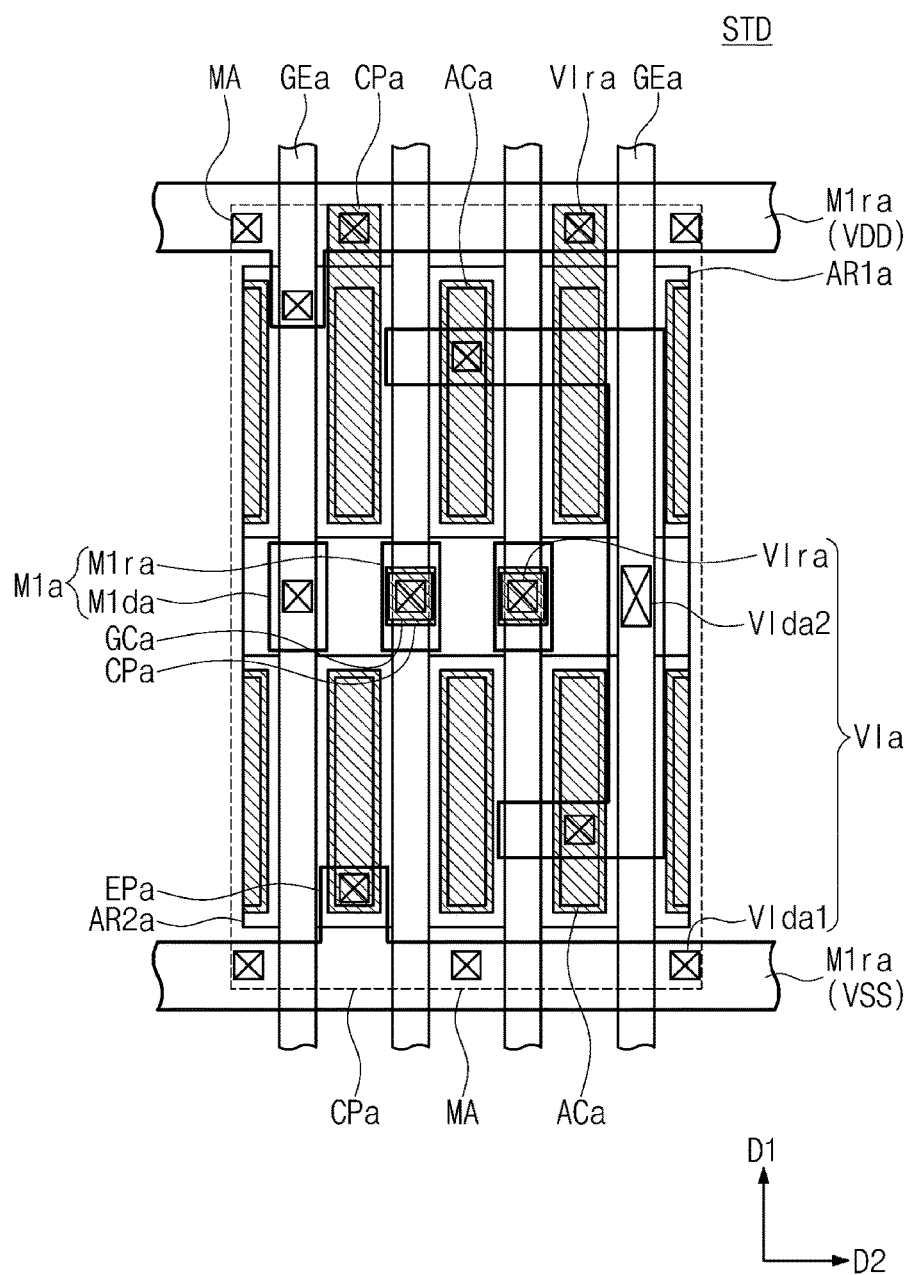
FIG. 8 is a diagram illustrating a layout of a standard cell according to exemplary embodiments of the inventive concepts, which is provided from a cell library.

FIG. 8 is a layout of a standard cell according to exemplary embodiments of the present inventive concepts, which is provided from a cell library. Here, the descriptions to the same technical features as in the embodiments of FIGS. 3 and 4 will be omitted and it may be assumed that the omitted details are at least similar to details of corresponding elements described elsewhere. Differences between the present embodiment and the embodiments of FIGS. 3 and 4 will be mainly described hereinafter.

Referring to FIGS. 2 and 8, the layout design process (S20) may include modifying shapes of the interconnection line patterns M1ra of the standard cell STD of FIG. 3. For example, an extension pattern EPa may be added to the interconnection line pattern M1ra defining the power interconnection line to modify the shape of the interconnection line pattern M1ra. An extension pattern EPa may be added to the interconnection line pattern M1ra defining the ground interconnection line to modify the shape of the interconnection line pattern M1ra.

The layout design process (S20) may include placing additional layout patterns on the standard cell STD of FIG. 3. For example, dummy via patterns VIda and a dummy interconnection line pattern M1da may further be placed on the standard cell STD of FIG. 3. At least one dummy via pattern VIda may overlap with the extension pattern EPa of the interconnection line pattern M1ra defining the power interconnection line.

The dummy via patterns VIda may include first dummy via patterns VIda1 and a second dummy via pattern VIda2. The first dummy via patterns VIda1 may be the same as the dummy via patterns VIda described with reference to FIG. 4. The second dummy via pattern VIda2 may have a width in the first direction D1, which is greater than widths of the first dummy via patterns VIda1 in the first direction D1.

Figure 9:
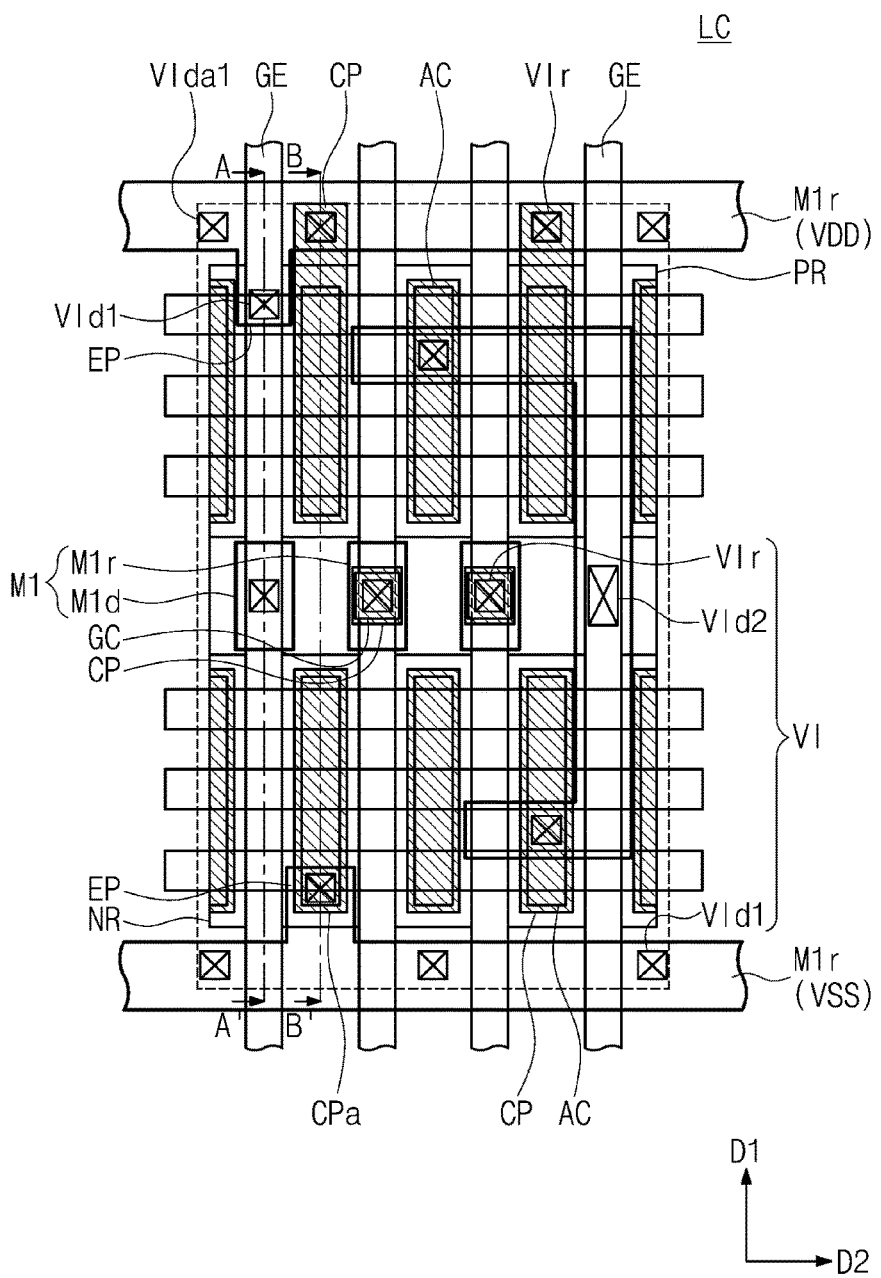
FIG. 9 is a plan view illustrating a semiconductor device according to exemplary embodiments of the inventive concepts.
Figure 10A:
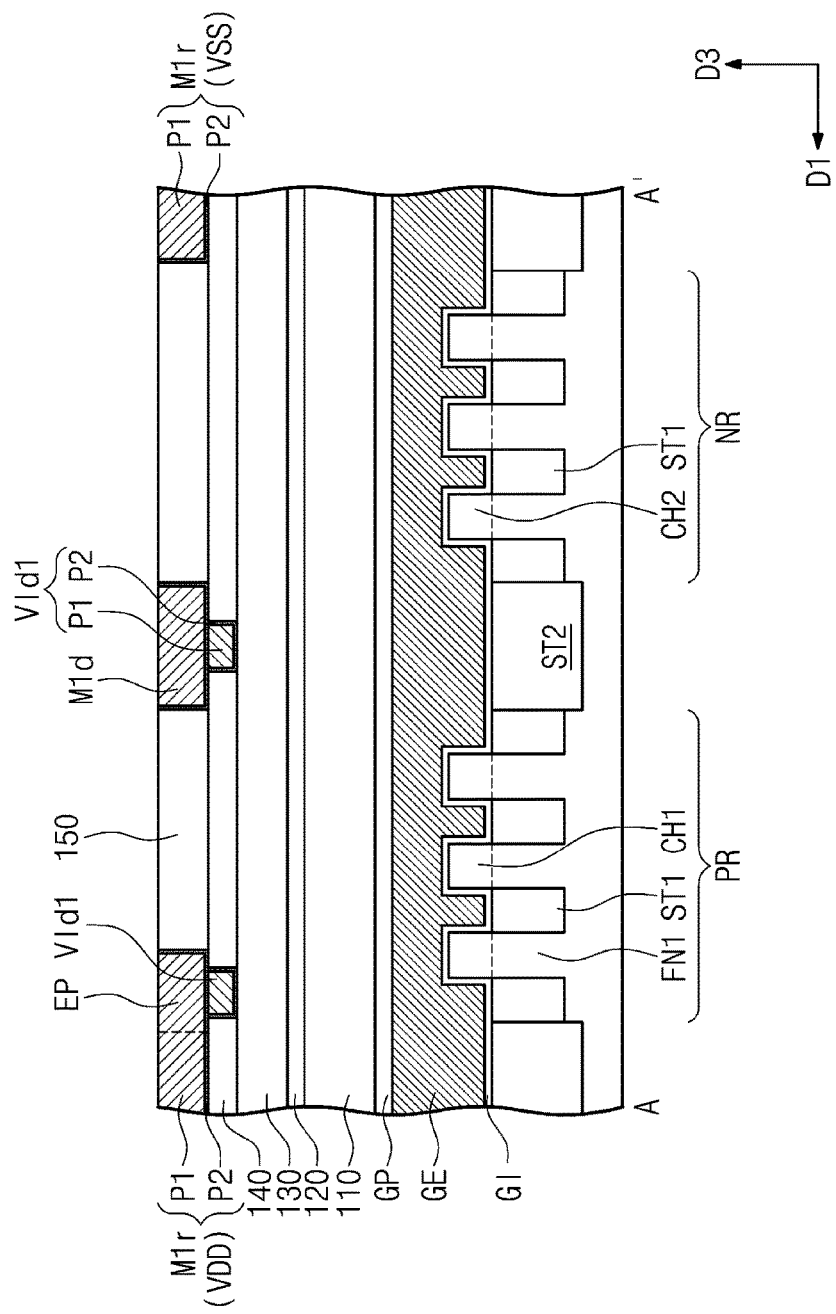

FIG. 9 is a plan view illustrating a semiconductor device according to exemplary embodiments of the present inventive concepts. FIGS. 10A and 10B are cross-sectional views taken along lines A-A' and B-B' of FIG. 9, respectively. A semiconductor device illustrated in FIGS. 9, 10A and 10B is an example of a semiconductor device that is realized on a physical substrate by using the layout of the standard cell of FIG. 8. Here, the descriptions to the same technical features as in the embodiments of FIGS. 5 and 6A to 6E will be omitted and it may be understood that the omitted details may at least be similar to details of corresponding elements descried elsewhere. Differences between the present embodiment and the embodiments of FIGS. 5 and 6A to 6E will be mainly described hereinafter.

Referring to FIGS. 9, 10A, and 10B, dummy vias VId may include first dummy vias VId1 and a second dummy via VId2. The first dummy vias VId1 may be substantially the same as the dummy vias VId described with reference to FIGS. 5 and 6A to 6E. The second dummy via VId2 may have a width in the first direction D1, which is greater than widths of the first dummy vias VId1 in the first direction D1. The second dummy via VId2 may be provided under at least one regular interconnection line M1r. The second dummy via VId2 may be disposed between the PMOSFET region PR and the NMOSFET region NR when viewed in a plan view.

The power interconnection line VDD may include an extension EP. The extension EP of the power interconnection line VDD may extend from the power interconnection line VDD toward the dummy interconnection line M1d. The first dummy via VId1 may be provided under the extension EP of the power interconnection line VDD.

The ground interconnection line VSS may include an extension EP. The extension EP of the ground interconnection line VSS may extend from the ground interconnection line VSS in the first direction D1. The extension EP of the ground interconnection line VSS may vertically overlap a portion of the connection structure CP. The regular via VIr may be provided between the extension EP of the ground interconnection line. VSS and the connection structure CP.

Figure 11:
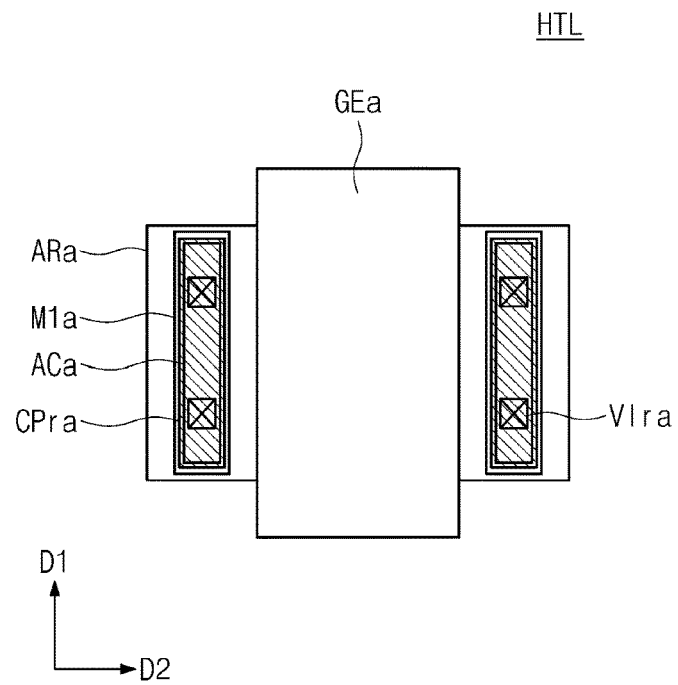
FIG. 11 is a diagram illustrating a layout of a high-voltage transistor provided from a cell library.

FIG. 11 is a diagram illustrating a layout of a high-voltage transistor provided from a cell library.

Referring to FIGS. 2 and 11, the cell library of the layout design process (S20) may include a layout HTL of a high-voltage transistor. The layout HTL of the high-voltage transistor may include an active region ARa, a gate pattern GEa, active contact patterns ACa, connection patterns CPra, via patterns VIra, and interconnection line patterns M1a.

The active region ARa may define a transistor region. The gate pattern GEa may extend in a first direction D1 to intersect the active region ARa. The gate pattern GEa may define a gate electrode. The active contact patterns ACa may be placed on the active region ARa. The active contact patterns ACa may be disposed at both sides of the gate pattern GEa, respectively. The active contact patterns ACa may define active contacts.

The connection patterns CPra may overlap with the active contact patterns ACa. The connection patterns CPra may define connection structures. The via patterns VIra may be placed on the connection patterns CPra. The interconnection line patterns M1a may be placed on the via patterns VIra. The via patterns VIra may define vias, and the interconnection line patterns M1a may define interconnection lines.

Figure 12:
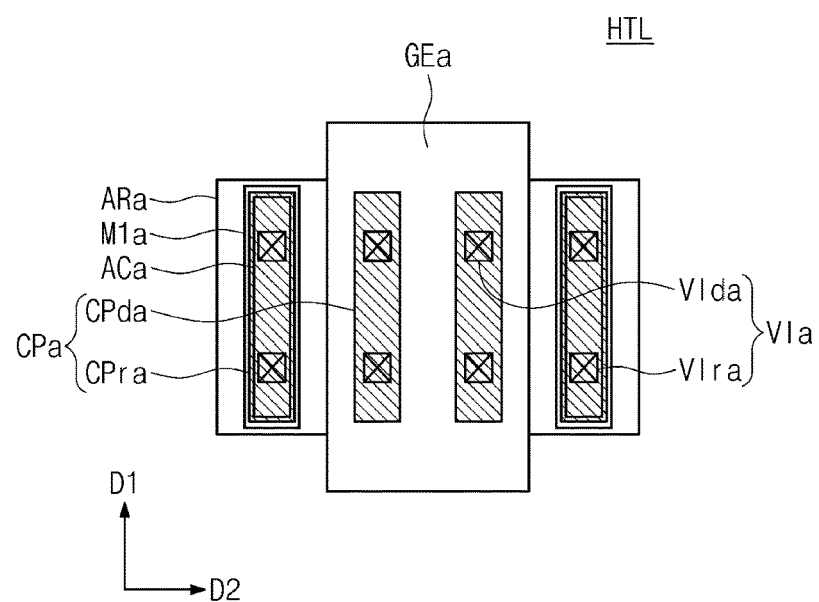
FIG. 12 is a diagram illustrating a layout of a high-voltage transistor according to exemplary embodiments of the inventive concepts, which is provided from a cell library.

FIG. 12 is a diagram illustrating a layout of a high-voltage transistor according to exemplary embodiments of the present inventive concepts, which is provided from a cell library. Here, the descriptions to the same technical features as in the layout of the high-voltage transistor of FIG. 11 will be omitted and it may be understood that the omitted details are at least similar to the details of corresponding elements described elsewhere. For example, differences between the layout of FIG. 12 and the layout of the high-voltage transistor of FIG. 11 will be mainly described hereinafter.

Referring to FIGS. 2 and 12, the layout design process (S20) may include placing additional layout patterns on the layout HTL of the high-voltage transistor of FIG. 11. For example, dummy connection patterns CPda and dummy via patterns VIda may be additionally placed on the layout HTL of the high-voltage transistor of FIG. 11.

A layout of a high-voltage transistor may include connection patterns CPa. and via patterns VIa. The connection patterns CPa may include regular connection patterns CPra and the dummy connection patterns CPda. The via patterns VIa may include regular via patterns VIra and the dummy via patterns VIda.

The dummy connection patterns CPda may be provided in an area in which the active contact patterns ACa are absent from. The dummy connection patterns CPda may be provided on the gate pattern GEa. The dummy via patterns VIda may overlap with the dummy connection patterns CPda.

The dummy connection patterns CPda added may increase a pattern density of the connection patterns CPa in the layout HTL of the high-voltage transistor. The dummy via patterns VIda added may increase a pattern density of the via patterns VIa in the layout HTL of the high-voltage transistor.

Figure 13:
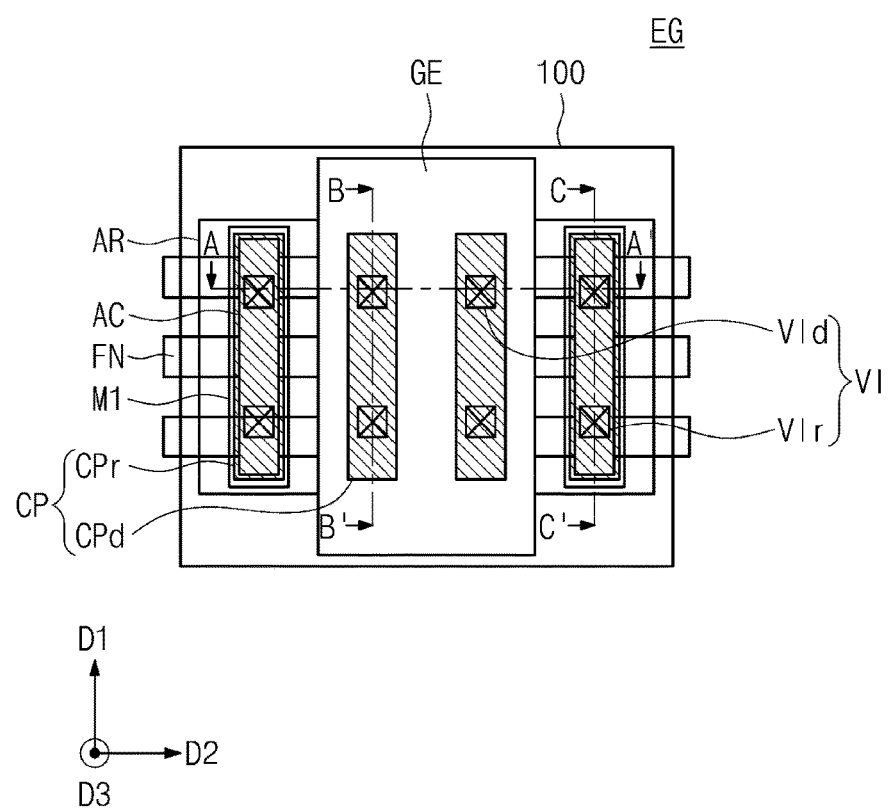
FIG. 13 is a plan view illustrating a semiconductor device according to exemplary embodiments of the inventive concepts.
Figure 14A:
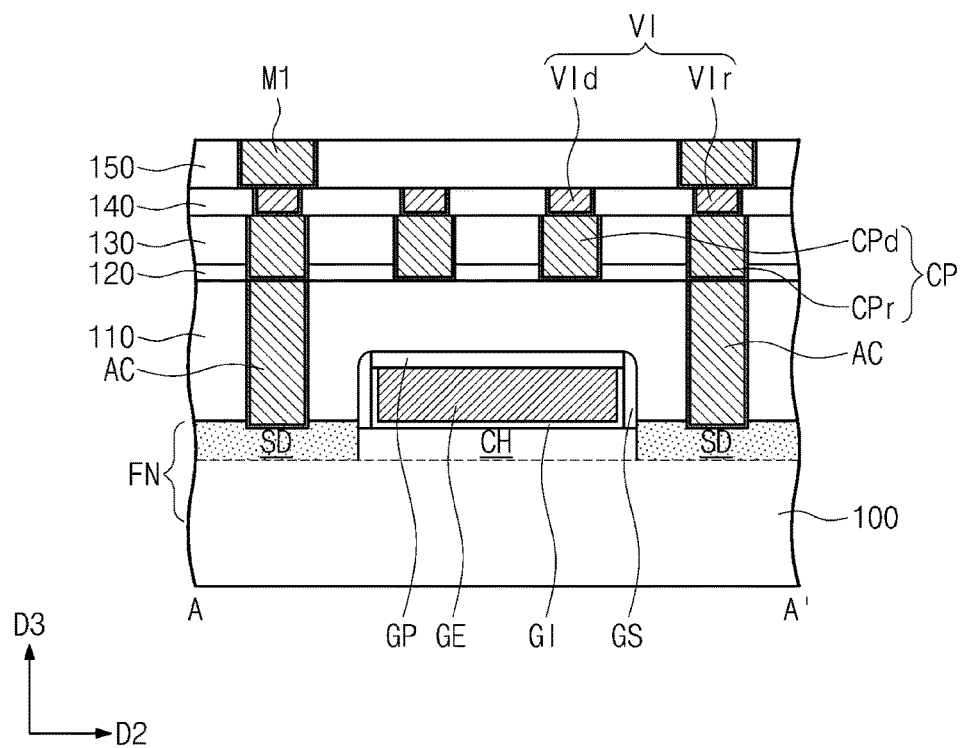
FIGS. 14A to 14C are cross-sectional views taken along lines A-A', B-B', and C-C' of FIG. 13, respectively.
Figure 14B:
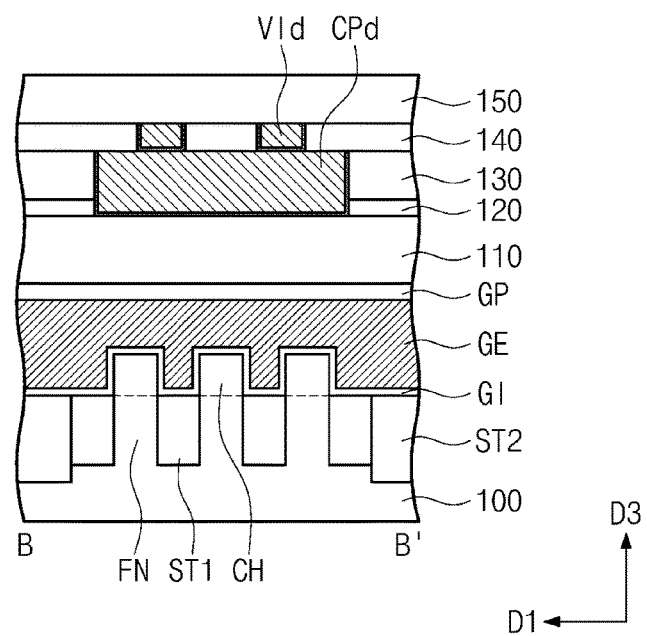
Figure 14C:
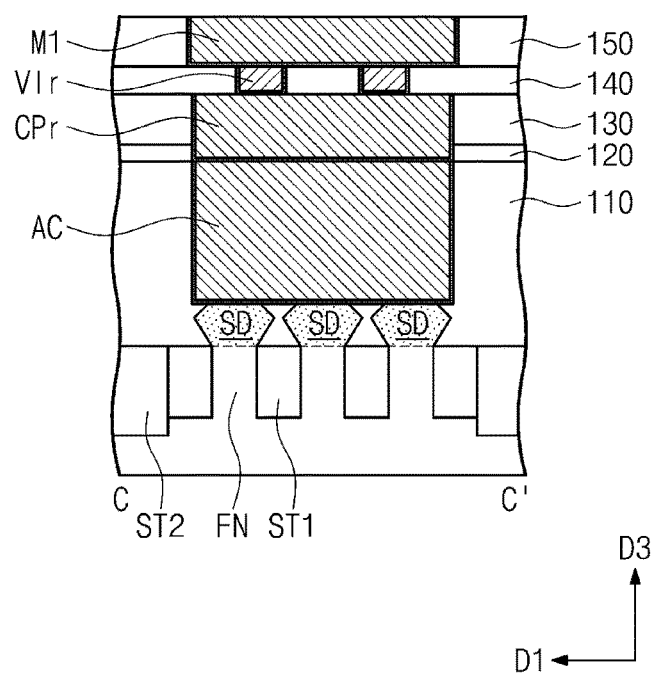

FIG. 13 is a plan view illustrating a semiconductor device according to exemplary embodiments of the present inventive concepts. FIGS. 14A to 14C are cross-sectional views taken along lines A-A', B-B', and C-C' of FIG. 13, respectively. A semiconductor device illustrated in FIGS. 13 and 14A to 14C is an example of a semiconductor device that is realized on a physical substrate by using the layout of the high-voltage transistor of FIG. 12.

Referring to FIGS. 13 and 14A to 14C, a high-voltage transistor EG may be provided on a substrate 100. For example, a second device isolation layer ST2 may be provided in the substrate 100 to define a transistor region AR. A plurality of active patterns FN extending in a second direction D2 may be provided on the transistor region AR. First device isolation layers ST1 may be disposed at both sides of each of the active patterns FN. A channel region CH and source/drain regions SD may be provided in an upper portion of each of the active patterns FN. A gate electrode GE may be provided on the active patterns FN. The gate electrode GE may extend in a first direction D1 to intersect the active patterns FN. First to fifth interlayer insulating layers 110, 120, 130, 140 and 150 may be provided on the substrate 100 to cover the gate electrode GE.

Active contacts AC may penetrate the first interlayer insulating layer 110 so as to be electrically connected to the source/drain regions SD. The active contacts AC may have bar shapes extending in the first direction D1. Connection structures CP may be provided in the second and third interlayer insulating layers 120 and 130. The connection structures CP may include regular connection structures CPr which are electrically connected to the active contacts AC, and dummy connection structures CPd which are not electrically connected to the active contacts AC.

The dummy connection structures CPd may overlap with the gate electrode GE when viewed in a plan view. However, since the dummy connection structures CPd are disposed on the first interlayer insulating layer 110, the dummy connection structures CPd may be vertically spaced apart from the gate electrode GE. Thus, the dummy connection structures CPd might not be electrically connected to the gate electrode GE.

Vias VI may be provided in the fourth interlayer insulating layer 140. The vias VI may include regular vias VIr electrically connected to the regular connection structures CPr and dummy vias VId connected to the dummy connection structures CPd. Interconnection lines M1 may be provided in the fifth interlayer insulating layer 150. The interconnection lines M1 may be electrically connected to the regular vias VIr.

Figure 15:
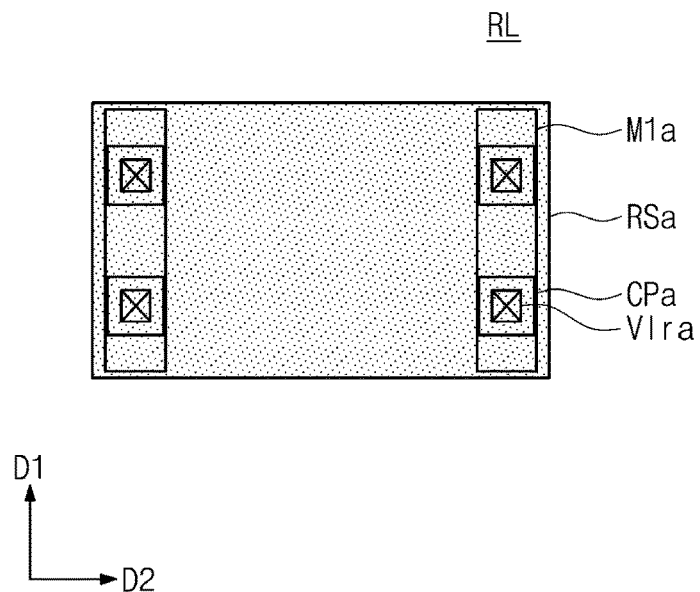
FIG. 15 is a diagram illustrating a layout of a resistance structure provided from a cell library.

FIG. 15 is a layout of a resistance structure provided from a cell library.

Referring to FIGS. 2 and 15, the cell library of the layout design process (S20) may include a layout RL of a resistance structure. The layout RL of the resistance structure may include a resistance pattern RSa, connection patterns CPa, via patterns VIra, and interconnection line patterns M1a.

The resistance pattern RSa may define a resistance layer. The connection patterns CPa may be placed on the resistance pattern RSa. The connection patterns CPa may define connection structures. The via patterns VIra may be placed on the connection patterns CPa. The interconnection line patterns M1a may be placed on the via patterns VIra. The via patterns VIra may define vias, and the interconnection line patterns M1a may define interconnection lines.

Figure 16:
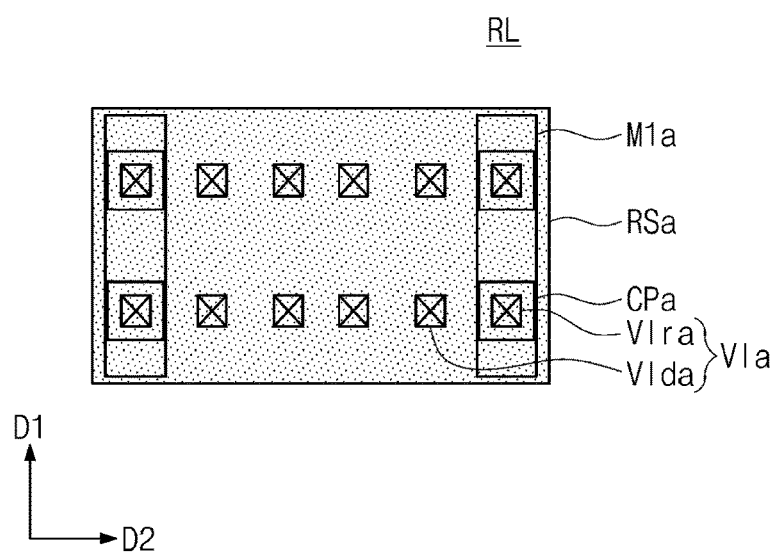
FIG. 16 is a diagram illustrating a layout of a resistance structure according to exemplary embodiments of the inventive concepts, which is provided from a cell library.

FIG. 16 is a layout of a resistance structure according to exemplary embodiments of the inventive concepts, which is provided from a cell library. In the present embodiment, the descriptions to the same technical features as in the layout of the resistance structure of FIG. 15 will be omitted and it may be understood that the omitted details are at least similar to the details of corresponding elements described elsewhere. Differences between the present embodiment and the layout of the resistance structure of FIG. 15 will be mainly described herein after.

Referring to FIGS. 2 and 16, the layout design process (S20) may include placing additional layout patterns on the layout RL of the resistance structure of FIG. 15. For example, dummy via patterns VIda may be additionally placed on the layout RL of the resistance structure of FIG. 15.

A layout RL of a resistance structure may include via patterns VIa. The via patterns VIa may include regular via patterns VIra. and the dummy via patterns VIda. The dummy via patterns VIda may be provided in an area in which the connection patterns CPa are absent from. The dummy via patterns VIda may overlap with the resistance pattern RSa.

The dummy via patterns VIda added may increase a pattern density of the via patterns VIa in the layout RL of the resistance structure.

FIG. 17 is a plan view illustrating a semiconductor device according to exemplary embodiments of the present inventive concepts. FIG. 18 is a cross-sectional view taken along a line A-A' of FIG. 17. A semiconductor device illustrated in FIGS. 17 and 18 is an example of a semiconductor device that is realized on a physical substrate by using the layout of the resistance structure of FIG. 16.

Referring to FIGS. 17 and 18, a resistance structure RES may be provided on a substrate 100. For example, a second device isolation layer ST2 may be provided on the substrate 100. First to fifth interlayer insulating layers 110, 120, 130, 140 and 150 may be sequentially stacked on the second device isolation layer ST2.

A resistance layer RS may be provided in the second interlayer insulating layer 120. The resistance layer RS may cover a top surface of the first interlayer insulating layer 110. A thickness of the resistance layer RS may be smaller than a thickness of a connection structure CP, a thickness of a via VI, and a thickness of an interconnection line M1. The resistance layer RS may include aluminum, copper, tungsten, molybdenum, and/or cobalt.

Connection structures CP may be provided in the third interlayer insulating layer 130. The connection structures GP may be electrically connected to the resistance layer RS. Vias VI may be provided in the fourth interlayer insulating layer 140. The vias VI may include regular vias VIr and dummy vias VId. The regular vias VIr may be electrically connected to the resistance layer RS through the connection structures CP, and the dummy vias VId might not be electrically connected to the resistance layer RS.

The dummy vias VId may overlap with the resistance layer RS when viewed in a plan view. The dummy vias VId may be spaced apart from the resistance layer RS with the third interlayer insulating layer 130 interposed therebetween. The dummy vias VId may be spaced apart from the connection structures CP with the third interlayer insulating layer 130 interposed therebetween. A top surface of the third interlayer insulating layer 130 may cover bottom surfaces of the dummy vias VId.

Interconnection lines M1 may be provided in the fifth interlayer insulating layer 150. The interconnection lines M1 may be electrically connected to the regular vias VIr. The interconnection lines M1 might not be disposed on the dummy vias VId. A bottom surface of the fifth interlayer insulating layer 150 may cover top surfaces of the dummy vias VId.

Figure 19:
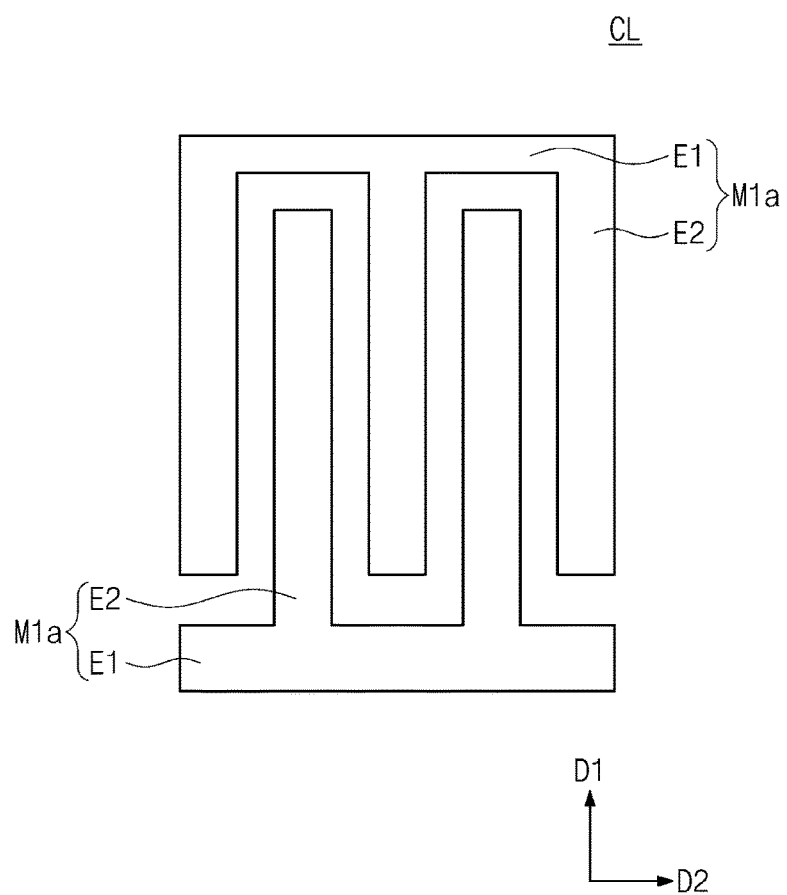
FIG. 19 is a diagram illustrating a layout of a capacitor provided from a cell library.

FIG. 19 is a layout of a capacitor provided from a cell library.

Referring to FIGS. 2 and 19, the cell library of the layout design process (S20) may include a layout CL of a capacitor. The layout CL of the capacitor may include interconnection line patterns M1a. Each of the interconnection line patterns M1a may include a first portion E1 extending in a second direction D2 and a second portion E2 extending in a first direction D1.

Figure 20:
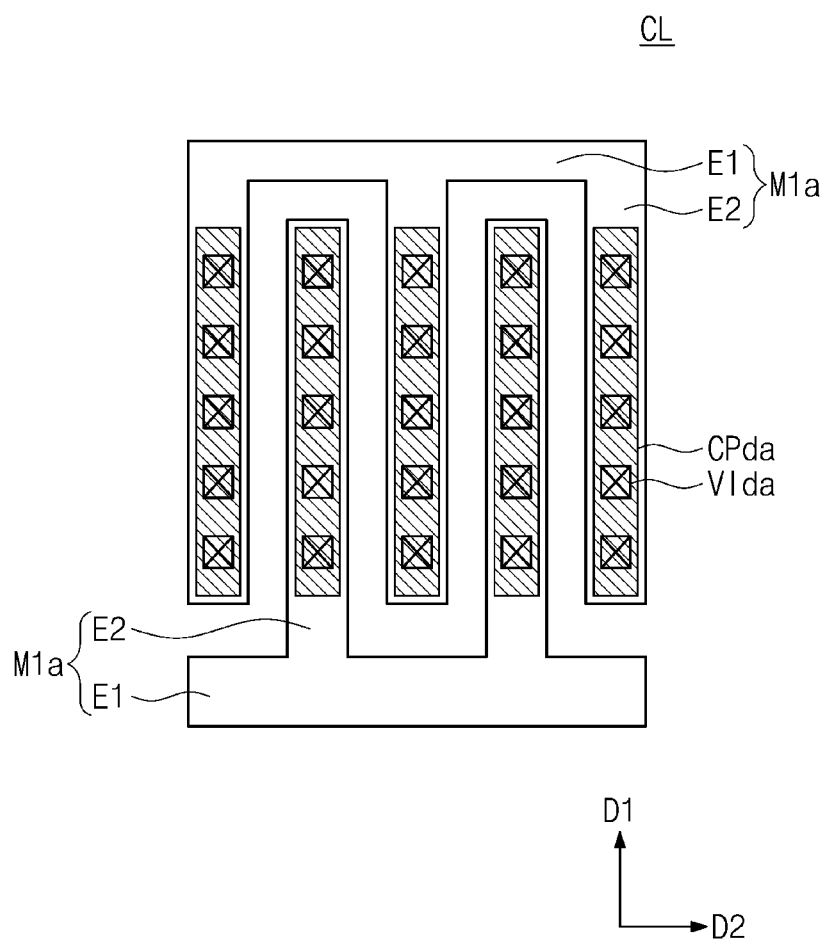
FIG. 20 is a layout of a capacitor according to exemplary embodiments of the inventive concepts, which is provided from a cell library.

FIG. 20 is a layout of a capacitor according to exemplary embodiments of the present inventive concepts, which is provided from a cell library. Here, the descriptions to the same technical features as in the layout of the capacitor of FIG. 19 will be omitted and it may be understood that the omitted details are at least similar to the details of corresponding elements described elsewhere. Differences between the present embodiment and the layout of the capacitor of FIG. 19 will be mainly described hereinafter.

Referring to FIGS. 2 and 20, the layout design process (S20) may include placing additional layout patterns on the layout CL of the capacitor of FIG. 19. For example, dummy connection patterns CPda and dummy via patterns VIda may be additionally placed on the layout CL of the capacitor of FIG. 19.

The dummy connection patterns CPda may overlap with the second portions E2 of the interconnection line patterns M1a. The dummy via patterns VIda may overlap with the dummy connection patterns CPda.

The dummy connection patterns CPda added may increase a pattern density of connection patterns in the layout CL of the capacitor. The dummy via patterns VIda added may increase a pattern density of via patterns in the layout CL of the capacitor.

Figure 21:
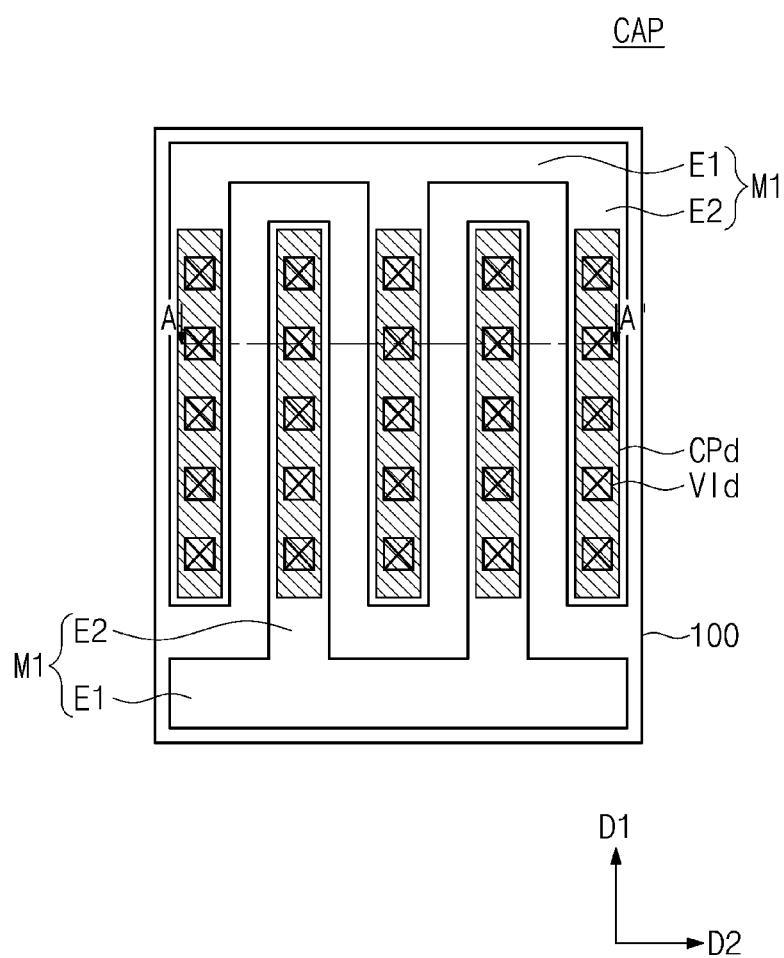
FIG. 21 is a plan view illustrating a semiconductor device according to exemplary embodiments of the inventive concepts.
Figure 22:
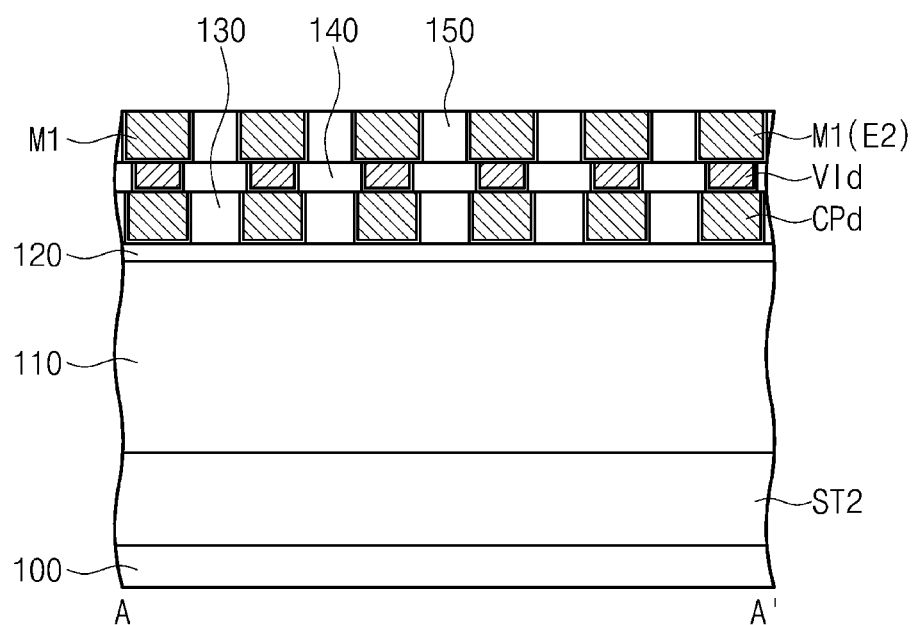
FIG. 22 is a cross-sectional view taken along a line A-A' of FIG. 21.

FIG. 21 is a plan view illustrating a semiconductor device according to exemplary embodiments of the inventive concepts. FIG. 22 is a cross-sectional view taken along a line A-A' of FIG. 21. A semiconductor device illustrated in FIGS. 21 and 22 is an example of a semiconductor device that is realized on a physical substrate by using the layout of the capacitor of FIG. 20.

Referring to FIGS. 21 and 22, a capacitor CAP may be provided on a substrate 100. For example, a second device isolation layer ST2 may be provided on the substrate 100. First to fifth interlayer insulating layers 110, 120, 130, 140 and 150 may be sequentially stacked on the second device isolation layer ST2.

Dummy connection structures CPd may be provided in the third interlayer insulating layer 130. The second interlayer insulating layer 120 may completely cover bottom surfaces of the dummy connection structures CPd. Dummy vias VId may be provided in the fourth interlayer insulating layer 140. The dummy vias VId may be provided on the dummy connection structures CPd. Interconnection lines M1 may be provided in the fifth interlayer insulating layer 150. Each of the interconnection lines M1 may include a first portion E1 extending in a second direction D2 and a second portion E2 extending in a first direction D1. The second portion E2 of each of the interconnection lines M1 may be provided on the dummy vias VId.

Figure 23:
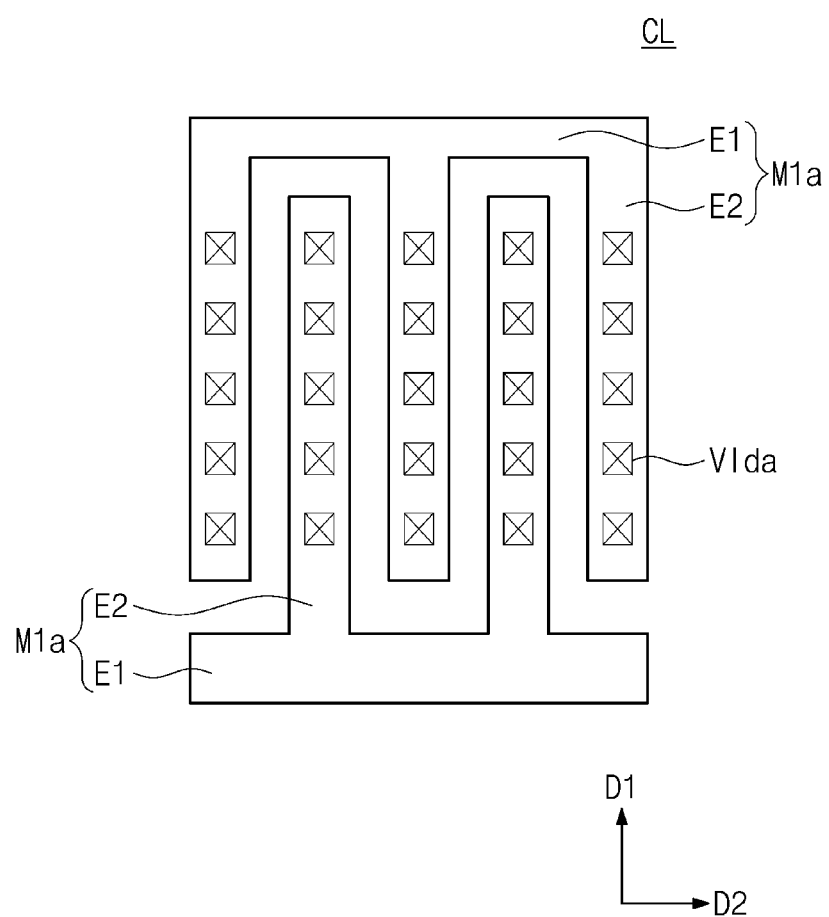
FIG. 23 is a layout of a capacitor according to exemplary embodiments of the inventive concepts, which is provided from a cell library.

FIG. 23 is a layout of a capacitor according to exemplary embodiments of the present inventive concepts, which is provided from a cell library. Here, the descriptions to the same technical features as in the embodiment of FIG. 20 will be omitted and it may be understood that the omitted details are at least similar to the details of corresponding elements described elsewhere. Differences between the present embodiment and the embodiment of FIG. 20 will be mainly described hereinafter.

Referring to FIGS. 2 and 23, the layout design process (S20) may include placing additional layout patterns on the layout CL of the capacitor of FIG. 19. For example, dummy via patterns VIda may be additionally placed on the layout CL of the capacitor of FIG. 19. As compared with the layout CL of the capacitor of FIG. 20, the dummy connection patterns CPda may be omitted in the layout CL of the capacitor.

Figure 24:
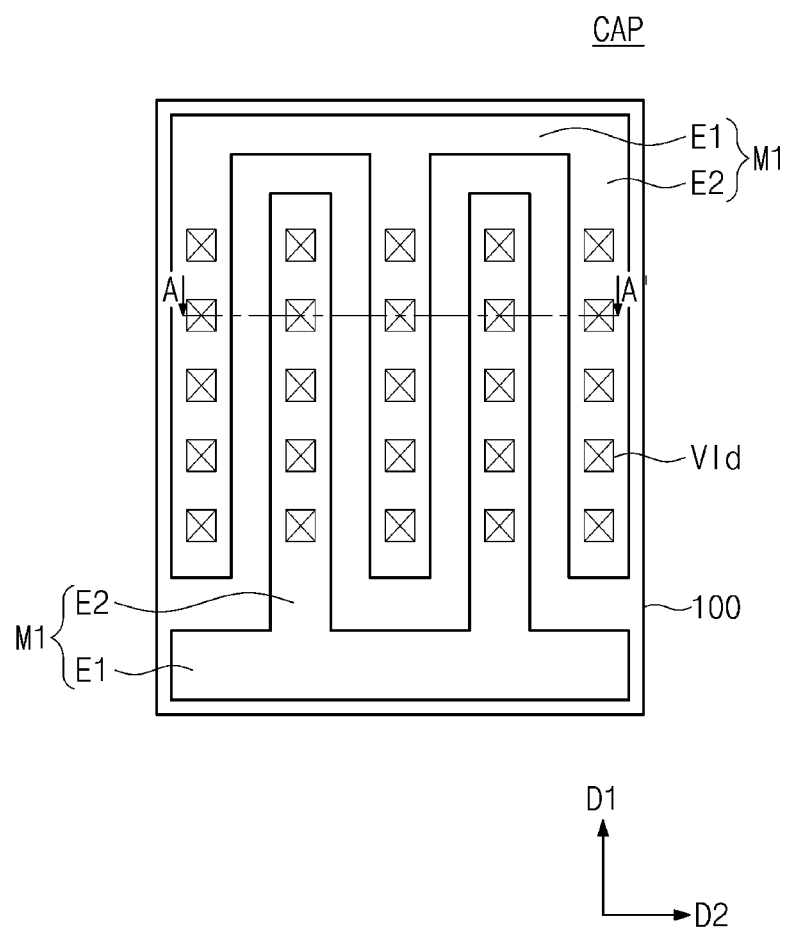
FIG. 24 is a plan view illustrating a semiconductor device according to exemplary embodiments of the inventive concepts.

FIG. 24 is a plan view illustrating a semiconductor device according to exemplary embodiments of the present inventive concepts. FIG. 25 is a cross-sectional view taken along a line A-A' of FIG. 24. A semiconductor device illustrated in FIGS. 24 and 25 is an example of a semiconductor device that is realized on a physical substrate by using the layout of the capacitor of FIG. 23. Here, the descriptions to the same technical features as in the embodiment of FIGS. 21 and 22 will be omitted and it may be understood that the omitted details are at least similar to the details of corresponding elements described elsewhere. Differences between the present embodiment and the embodiment of FIGS. 21 and 22 will be mainly described hereinafter.

Referring to FIGS. 24 and 25, the dummy connection structures CPd may be omitted, unlike the capacitor CAP described above with reference to FIGS. 21 and 22.

In the semiconductor device according to exemplary embodiments of the present inventive concepts, the dummy vias may be additionally disposed to increase a pattern density of the vias. Thus, it is possible to reduce or minimize the distortion phenomenon of light which may be caused in the exposure process for forming the vias.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A semiconductor device comprising:
   a substrate including a plurality of active patterns;
   a plurality of gate electrodes intersecting the plurality of active patterns;
   an active contact electrically connected to the plurality of active patterns;
   a plurality of vias comprising a first regular via and a first dummy via; and
   a plurality of interconnection lines disposed on the plurality of vias,
   wherein the plurality of interconnection lines comprise a first interconnection line disposed on both the first regular via and the first dummy via,
   wherein the first interconnection line is electrically connected to the active contact through the first regular via,
   wherein each of the plurality of vias includes a via body portion and a via barrier portion covering a bottom surface and sidewalls of the via body portion, and
   wherein each of the plurality of interconnection lines includes an interconnection line body portion and an interconnection line barrier portion covering a bottom surface and sidewalls of the interconnection line body portion.

2. The semiconductor device of claim 1, further comprising:
   an interlayer insulating layer covering the active contact,
   wherein the plurality of vias are disposed on the interlayer insulating layer, and
   wherein a top surface of the interlayer insulating layer covers a bottom surface of the first dummy via.

3. The semiconductor device of claim 1, further comprising:
   a connection structure disposed between the active contact and the first regular via, wherein the first dummy via is spaced apart from the connection structure.

4. The semiconductor device of claim 1, further comprising:
a gate contact electrically connected to at least one of the plurality of gate electrodes,
wherein the plurality of vias further comprise:
a second regular via electrically connected to the gate contact; and
a second dummy via overlapping one of the plurality of gate electrodes,
wherein the second dummy via is spaced apart from the one gate electrode with an interlayer insulating layer interposed therebetween.

5. The semiconductor device of claim 1, wherein the barrier portion of the first interconnection line is disposed between the via body portion of the first dummy via and the interconnection line body portion of the first interconnection line.

6. The semiconductor device of claim 1, wherein the active contact includes an active contact body portion and an active contact barrier portion covering a bottom surface and sidewalls of the active contact body portion, and
wherein the active contact body portion of the active contact includes a conductive material different from that of the via body portion of each of the plurality of vias.

7. The semiconductor device of claim 1, wherein the first interconnection line has an extension extending in a direction parallel with an extending direction of the gate electrodes, and
wherein the first dummy via is disposed under the extension.

8. The semiconductor device of claim 1, wherein the first interconnection line has an extension extending in a direction parallel with an extending direction of the gate electrodes,
wherein the extension overlaps with a portion of the active contact, and
wherein the first regular via is disposed between the extension and the active contact.

9. The semiconductor device of claim 1, wherein a width of the first dummy via in a first direction is greater than a width of the first regular via in the first direction.

10. The semiconductor device of claim 1, wherein each of the plurality of active patterns comprises: a first active pattern disposed on a PMOSFET region; and a second active pattern disposed on an NMOSFET region,
wherein the first and second active patterns each extend in a first direction, and
wherein each of the plurality of gate electrodes extend in a second direction intersecting the first direction.

11. A semiconductor device comprising:
a substrate;
a plurality of transistors disposed on the substrate;
a first interlayer insulating layer covering the plurality of transistors;
a second interlayer insulating layer disposed on the first interlayer insulating layer;
a third interlayer insulating layer disposed on the second interlayer insulating layer;
a dummy via disposed in the second interlayer insulating layer; and
an interconnection line disposed on the third interlayer insulating layer,
wherein the first interlayer insulating layer covers a bottom surface of the dummy via,
wherein the dummy via includes a via body portion and a via barrier portion covering a bottom surface and sidewalls of the via body portion,
wherein the interconnection line includes an interconnection line body portion and an interconnection line barrier portion covering a bottom surface and sidewalls of the interconnection line body portion, and
wherein the interconnection line barrier portion of the interconnection line is disposed between the body portion of the dummy via and the body portion of the interconnection line.

12. The semiconductor device of claim 11, further comprising:
a contact disposed on the first interlayer insulating layer, the contact electrically connected to the plurality of transistors,
wherein the dummy via is spaced apart from the contact.

13. The semiconductor device of claim 11, wherein the interconnection line body portion of the interconnection line includes a same conductive material as the via body portion of the dummy via.

14. The semiconductor device of claim 11, further comprising:
a regular via disposed on the second interlayer insulating layer,
wherein the regular via electrically connects the interconnection line to the plurality of transistors.

15. The semiconductor device of claim 11, wherein the plurality of transistors comprises:
a plurality of first active patterns disposed on a PMOSFET region of the substrate;
a plurality of second active patterns disposed on an NMOSFET region of the substrate; and
a plurality of gate electrodes intersecting the plurality of first active patterns and the plurality of second active patterns.

16. A semiconductor device comprising:
a substrate;
a first interlayer insulating layer disposed on the substrate;
a second interlayer insulating layer disposed on the first interlayer insulating layer;
a third interlayer insulating layer disposed on the second interlayer insulating layer;
a connection structure disposed in the first interlayer insulating layer;
a plurality of vias disposed in the second interlayer insulating layer, the plurality of vias comprising a regular via and a dummy via; and
an interconnection line disposed in the third interlayer insulating layer,
wherein the regular via is disposed between the interconnection line and the connection structure and electrically connects the interconnection line to the connection structure,
wherein a level of a bottom surface of the dummy via is substantially the same as a level of a top surface of the connection structure, and
wherein the dummy via is spaced apart from the connection structure, such that a top surface of the first interlayer insulating layer covers a bottom surface of the dummy via.

17. The semiconductor device of claim 16, wherein the dummy via is disposed under the interconnection line and is in contact with the interconnection line.

18. The semiconductor device of claim 16, further comprising:
an active pattern disposed on the substrate;

a gate electrode disposed on the substrate; and a dummy connection structure disposed in the first interlayer insulating layer and insulated from both the active pattern and the gate electrode, wherein the dummy via is disposed on the dummy connection structure.

19. The semiconductor device of claim 16, wherein the dummy via is spaced apart from the interconnection line, and wherein a bottom surface of the third interlayer insulating layer covers a top surface of the dummy via.

20. The semiconductor device of claim 16, wherein each of the plurality of vias includes a via body portion and a via barrier portion covering a bottom surface and sidewalls of the via body portion, and wherein the interconnection line includes an interconnection line body portion and an interconnection line barrier portion covering a bottom surface and sidewalls of the interconnection line body portion.

* * * * *